(12) United States Patent
Matsui

(10) Patent No.: US 8,047,606 B2
(45) Date of Patent: Nov. 1, 2011

(54) HEADREST OPERATING DEVICES

(75) Inventor: Kei Matsui, Toyota (JP)

(73) Assignee: Toyota Boshoku Kabushiki Kaisha, Aichi-Ken (JP)

( * ) Notice: Subject to any disclaimer, the term of this patent is extended or adjusted under 35 U.S.C. 154(b) by 217 days.

(21) Appl. No.: 12/415,025

(22) Filed: Mar. 31, 2009

(65) Prior Publication Data

US 2009/0250981 A1 Oct. 8, 2009

(30) Foreign Application Priority Data

Apr. 2, 2008 (JP) ................................. 2008-096036

(51) Int. Cl.
*B60N 2/42* (2006.01)
(52) U.S. Cl. ......... 297/216.12; 297/216.13; 297/216.14; 297/406; 297/407; 297/409
(58) Field of Classification Search ............. 297/216.12, 297/216.13, 216.14, 406, 407, 409
See application file for complete search history.

(56) References Cited

U.S. PATENT DOCUMENTS

| | | | | |
|---|---|---|---|---|
| 5,772,280 | A * | 6/1998 | Massara ................... | 297/216.12 |
| 6,024,406 | A * | 2/2000 | Charras et al. ............ | 297/216.14 |
| 6,568,753 | B1 * | 5/2003 | Watanabe ................. | 297/216.12 |
| 7,044,544 | B2 * | 5/2006 | Humer et al. ............ | 297/216.12 |
| 7,284,794 | B2 * | 10/2007 | Yamaguchi et al. ..... | 297/216.12 |
| 7,404,606 | B2 * | 7/2008 | Kim ............................. | 297/408 |
| 7,422,280 | B2 * | 9/2008 | Brockman ................ | 297/216.12 |
| 7,523,987 | B2 * | 4/2009 | Yamaguchi .............. | 297/216.12 |
| 7,543,888 | B2 | 6/2009 | Kuno | |
| 7,731,280 | B2 * | 6/2010 | Niitsuma et al. ......... | 297/216.12 |
| 7,758,114 | B2 * | 7/2010 | Yokota et al. ............ | 297/216.12 |
| 7,758,115 | B2 * | 7/2010 | Yamaguchi et al. ..... | 297/216.12 |
| 7,766,424 | B2 * | 8/2010 | Haglund ................... | 297/216.13 |
| 2006/0202524 | A1 * | 9/2006 | Yamaguchi .............. | 297/216.12 |
| 2008/0252128 | A1 | 10/2008 | Nishikawa et al. | |
| 2009/0102266 | A1 | 4/2009 | Furukawa et al. | |
| 2009/0126520 | A1 | 5/2009 | Yamaguchi et al. | |
| 2009/0134683 | A1 | 5/2009 | Furukawa et al. | |
| 2009/0167066 | A1 * | 7/2009 | Mori et al. ............... | 297/216.12 |

FOREIGN PATENT DOCUMENTS

JP 2005-95237 4/2005

OTHER PUBLICATIONS

U.S. Appl. No. 12/259,612 to Suzuki et al., filed Oct. 28, 2008.

(Continued)

*Primary Examiner* — Laurie Cranmer
(74) *Attorney, Agent, or Firm* — Greenblum & Bernstein P.L.C.

(57) ABSTRACT

One aspect according to the invention can include a headrest operating device including a backside collision detecting device that can produce an operational force upon detection of occurrence of backside collision. The operational force of the backside collision detecting device can be transmitted to an operation member via an interlocking member. A switching device can switch a path of movement of the interlocking member between an inoperative path and an operative path. When no backside collision occurs, the interlocking member can move along the inoperative path, so that the operational force of the backside collision detecting device cannot be transmitted to the operation member. When the backside collision occurs, the interlocking member can move along the operative path, so that the operational force of the backside collision detecting device can be transmitted to the operation member.

22 Claims, 19 Drawing Sheets

OTHER PUBLICATIONS

U.S. Appl. No. 12/356,866 to Abe, filed Jan. 21, 2009.
U.S. Appl. No. 12/438,784 to Nishiura et al., filed Feb. 25, 2009.
U.S. Appl. No. 12/438,870 to Shimizu et al., filed Feb. 25, 2009.
U.S. Appl. No. 12/438,861 to Shimizu et al., filed Feb. 25, 2009.
U.S. Appl. No. 12/426,540 to Otsuka, filed Apr. 20, 2009.
English Language Abstract of JP 2005-095237, Apr. 14, 2005.
China Office action, dated Mar. 25, 2011 along with an english translation thereof.

* cited by examiner

HEADREST OPERATING DEVICES

This application claims priority to Japanese patent application serial number 2008-096036, the contents of which are incorporated herein by reference.

BACKGROUND OF THE INVENTION

1. Technical Field

The present invention relates to headrest operating devices that are operable to move a headrest toward a head portion of a person seated on a vehicle seat of a vehicle when a backside collision occurs. In this specification, the term "back side collision" is used to mean the situation where an object, such as another vehicle, collides with the backside of the vehicle.

2. Description of the Related Art

A vehicle seat is known that has a mechanism for supporting a head portion of a seated person by moving a headrest toward the head portion of the seated person when a backside collision occurs. For example, Japanese Laid-Open Patent Publication No. 2005-95237 teaches a headrest operating device for moving a headrest based on a load that may be applied to a seat back by a seated person when a backside collision occurs.

According to the headrest operating device of the above publication, a pressure receiving mechanism disposed within the seat back for receiving the load from the seated person is configured not to operate unless the backside collision occurs. Therefore, the headrest may not be accidentally moved even if the seated person leans on the seat back to apply a large load to the seat back. More specifically, the pressure receiving mechanism is coupled to a weight that can move by an inertia force when the backside collision occurs. The weight is coupled to a lock mechanism for locking and unlocking the headrest, so that the lock mechanism maintains the lock condition of the headrest unless the inertia force moves the weight.

However, the headrest operating device of the above publication requires a relatively large installation space for the pressure receiving mechanism, the lock mechanism and a device for detecting the backside collision.

Thus, there is a need in the art for a headrest operating device that has an accidental operation preventing device and has a compact construction.

SUMMARY OF THE INVENTION

One aspect according to the invention can include a headrest operating device including a backside collision detecting device that can produce an operational force upon detection of occurrence of backside collision. The operational force of the backside collision detecting device can be transmitted to an operation member via an interlocking member. A switching device can switch a path of movement of the interlocking member between an inoperative path and an operative path. When no backside collision occurs, the interlocking member can move along the inoperative path, so that the operational force of the backside collision detecting device cannot be transmitted to the operation member. When the backside collision occurs, the interlocking member can move along the operative path, so that the operational force of the backside collision detecting device can be transmitted to the operation member.

DETAILED DESCRIPTION OF THE INVENTION

Each of the additional features and teachings disclosed above and below may be utilized separately or in conjunction with other features and teachings to provide improved headrest operating devices. Representative examples of the present invention, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
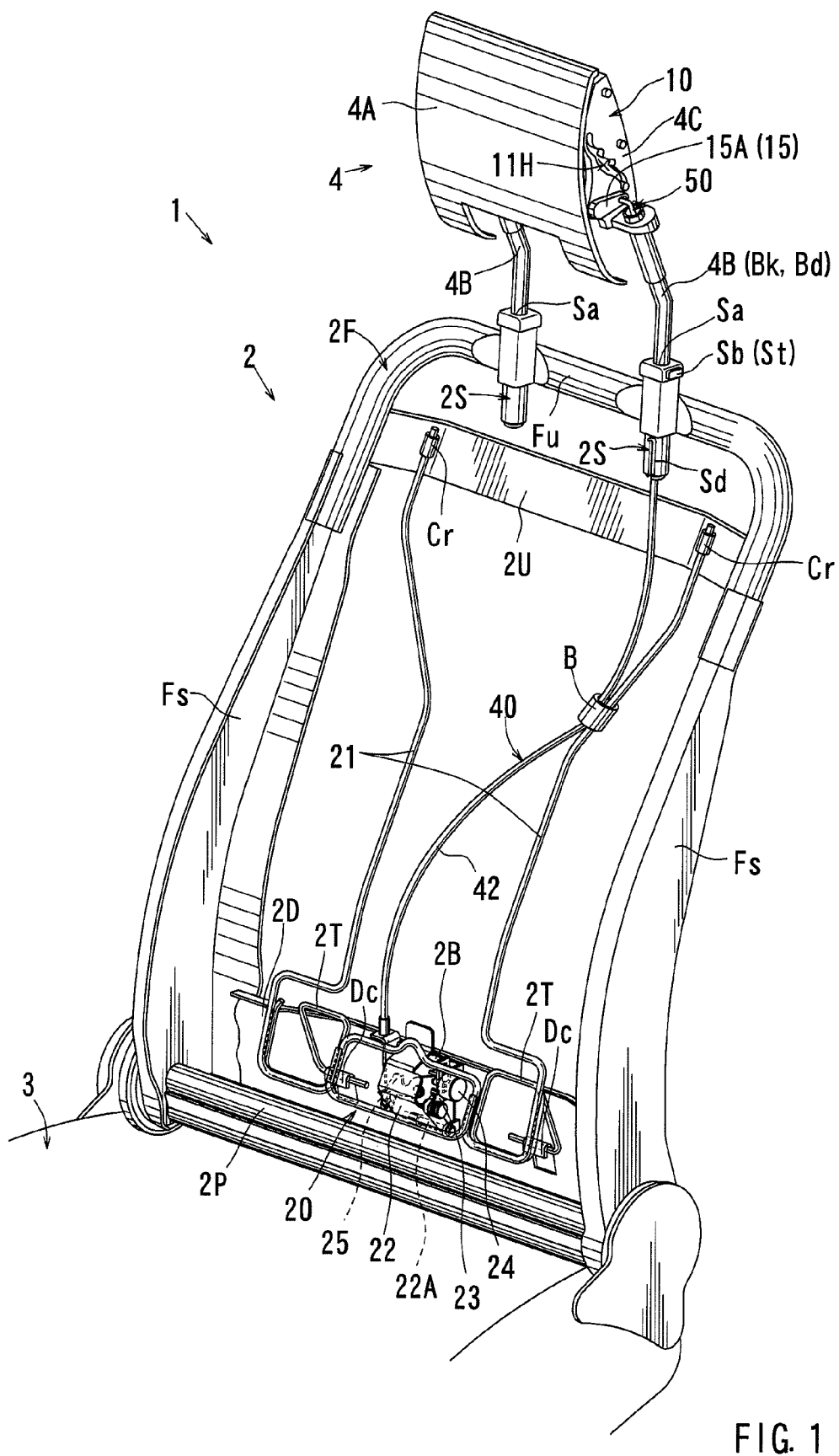
FIG. 1 is a general perspective view of a headrest operating device according to an embodiment of the present invention.

An embodiment of the present invention will now be described with reference to FIG. 1 through FIG. 19. FIG. 1 shows a vehicle seat 1 incorporating a headrest operating device of the embodiment. The vehicle seat 1 is constituted by a seat back 2 serving as a backrest of a seated person, a seat cushion 3 serving as a seating portion, and a headrest 4 serving as a head support. Further, according to the vehicle seat 1, when another vehicle collides with the backside of the vehicle incorporating the headrest operating device, the headrest 4 can move toward the head portion of the seated person instantaneously by the operation of the headrest operating device as will be explained later. In this specification, the situation where another vehicle collides with the backside of the vehicle will be called "backside collision."

In FIG. 1 and some of the other figures, in order to enable the inner structures of the headrest 4 and the seat back 2 to be easily understood, illustration of the skin structures of the headrest 4 and the seat back 2 is omitted. Here, the headrest 4 is mounted to and supported on an upper face portion of the seat back 2 by inserting two pipe-like stays 4B extending downwardly from the headrest 4 into tubular supports 2S provided at the upper face portion of the seat back 2.

The supports 2S are integrally fixed to an upper arm portion (upper frame Fu) of a back frame 2F of a gate type constituting a skeleton of the seat back 2. Further, the upper frame Fu is integrally coupled to both side frames Fs in such a manner that upper end portions of the both side frames Fs of the back frame 2F are connected to each other. The above-described headrest 4 is normally held at an upper portion of the seat back 2 for receiving the head portion of the seated person on a rear side thereof when the backside collision does not occur.

When the backside collision occurs, only a support portion 4A on a front side of the headrest 4, which receives the head portion, can instantaneously move forwardly. Therefore, when the backside collision occurs, only the support portion 4A for receiving the head portion can first move to a position proximate to the seated person, whose body may take a position floating forwardly from the headrest 4 and the seat back 2, and a movement of the head portion inclining rearward by a momentum produced due to the collision form the backside can be prevented at an early stage. Therefore, a load that may be applied to the neck portion of the seated person can be alleviated, and therefore, a whiplash injury can be prevented.

Figure 13:
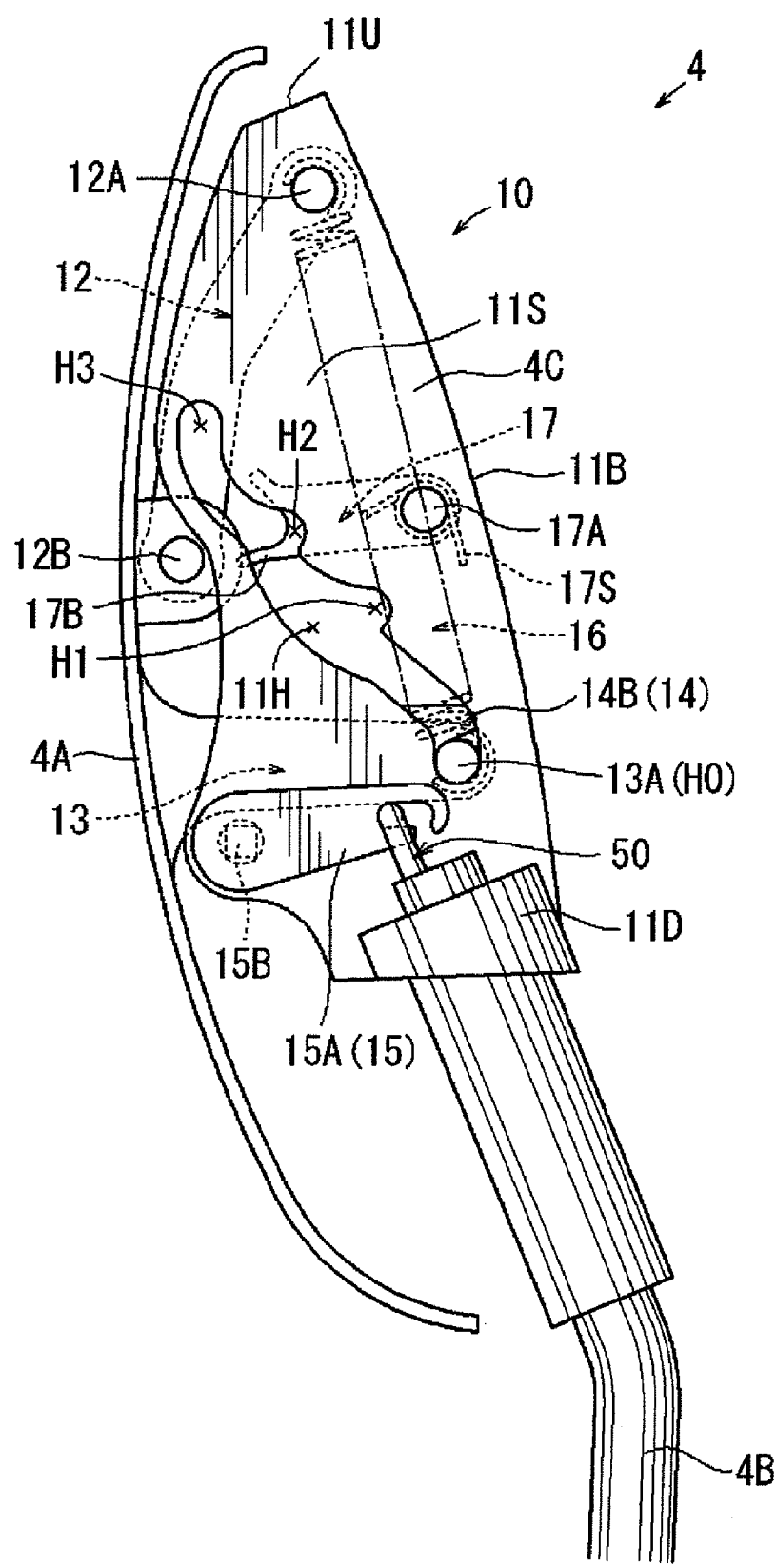
FIG. 13 is a side view showing the state where the headrest is held at the initial position.

The forward movement of the support portion 4A performed when the backside collision occurs is enabled by a headrest moving mechanism 10 assembled within the headrest 4. As shown in FIG. 13, the headrest moving mechanism 10 normally locks and holds the support portion 4A at an initial position by restricting the forward movement of the support portion 4A when the backside collision does not occurs. Here, the support portion 4A is urged in a direction toward the head portion normally by an biasing force of a tension spring 16 connected between the support portion 4A and a headrest base portion 4C constituting a main body of the headrest 4. The support portion 4A is normally held at the initial position against the urging force or the biasing force the tension spring 16 when the backside collision does not occur.

Figure 15:
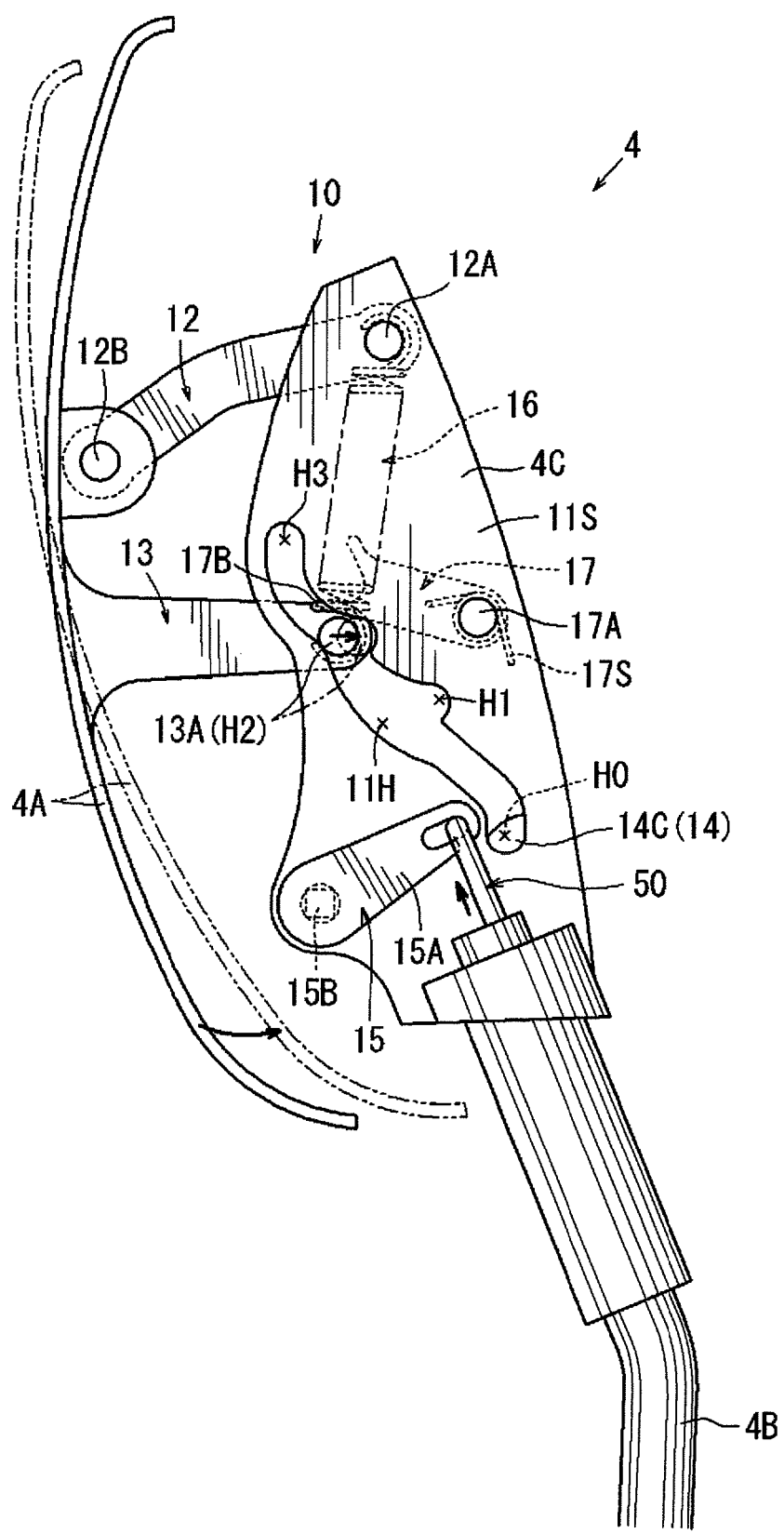
FIG. 15 is a side view showing the state where the headrest is positioned at a midpoint of during the forward movement.

Further, the headrest moving mechanism 10 can move the support portion 4A forwardly by the biasing force of the tension spring 16 by releasing the state of restricting the movement of the support portion 4A when the backside collision occurs. More specifically, the headrest moving mechanism 10 moves the support portion 4A to a position proximate to the rear side of the head (hereinafter called "collision accommodating position") as shown in FIG. 15 by moving the support portion 4A forwardly and upwardly along shapes of elongated holes 11H formed in the headrest base portion 4C that will be explained later.

Here, according to the headrest moving mechanism 10, because the support portion 4A can move to the collision accommodating position, the support portion 4A may not be pushed back rearwardly even in the case that a rearward inclining load of the head portion caused by the backside collision is applied to the support portion 4A. Therefore, when the back collision occurs, the head portion can be supported in stable by the support portion 4A positioned at the collision accommodating position.

Figure 2:
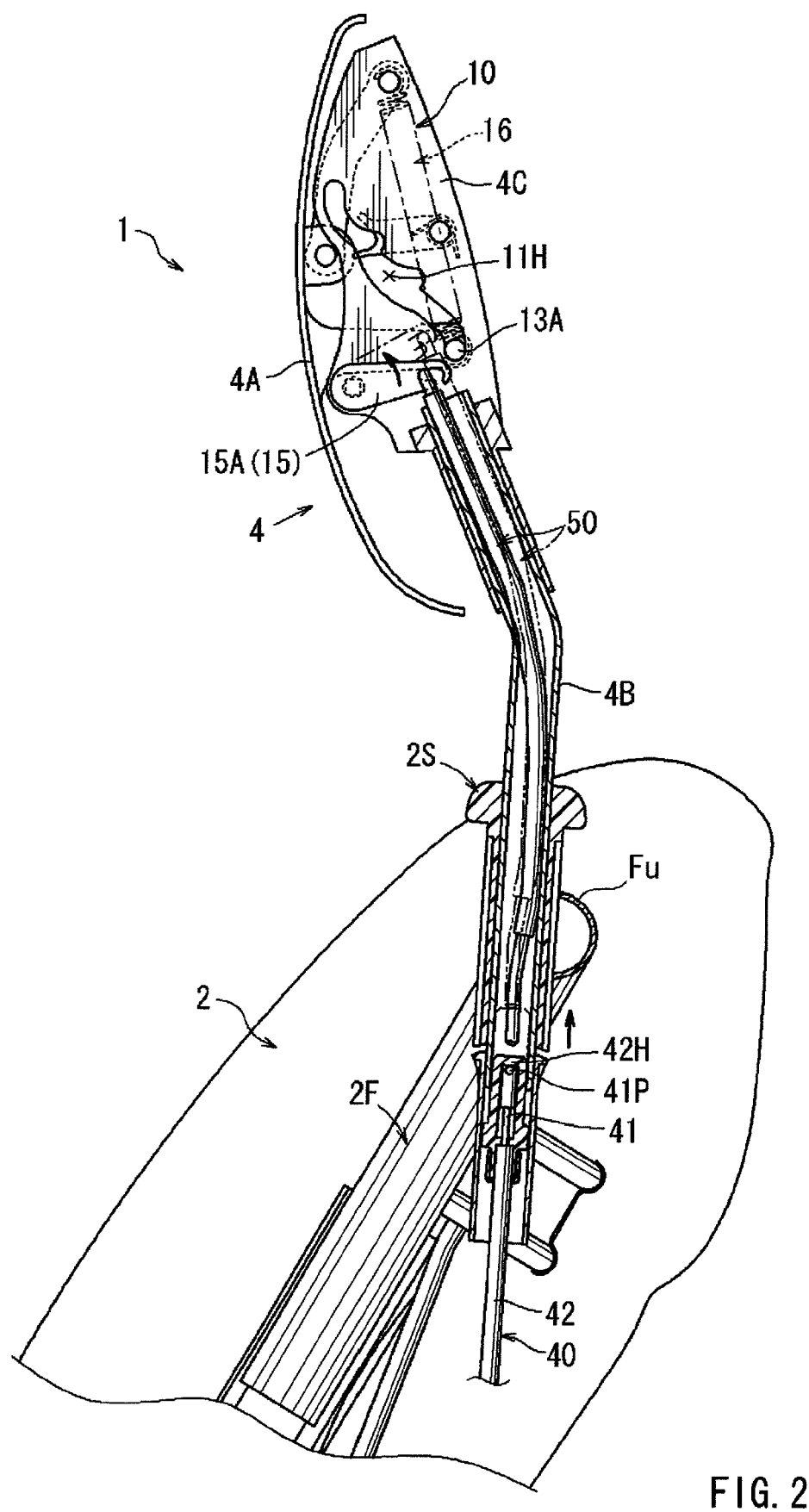
FIG. 2 is a view showing the operation for releasing an initial position holding state of a headrest of the headrest operating device when a backside collision occurs.

Meanwhile, referring back to FIG. 1, the release of the state of restricting the movement of the support portion 4A in the case of the backside collision is carried out by the operation of pushing up a push rod 50 that is inserted into the right side tubular stay 4B of the headrest 4. As shown by FIG. 2, an upper end portion of the push rod 50 is connected to a releasing member 15 provided for a lock releasing operation of the headrest moving mechanism 10. Further, a lower end portion of the push rod 50 is connected to an upper end portion of an operation cable 40 wired within the seat back 2.

Here, as shown in FIG. 1, the operation cable 40 has an inner cable 41 and an outer cable 42. A lower end portion of the inner cable 41 is connected to a pressure receiving mechanism 20 serving as a backside collision detecting mechanism and arranged within the seat back 2. Further, a lower end portion of the outer cable 42 is engaged with and fixed to a base plate 2B that is fixedly mounted to a lower reinforcement plate 2D extending between the both side frames Fs of the back frame 2F.

Here, the pressure receiving mechanism 20 includes a formed wire 21 extended in a vertically prolonged manner at a center portion of the seat back 2, and a pressure receiving plate 22 arranged at a lower portion to be opposed to the waist portion of the seated person. The pressure receiving mechanism 20 is constructed such that, when the backside collision occurs, the occurrence of the back side collision is detected as an operation movement amount of the pressure receiving plate 22 that is pushed toward the rear side by the back portion of the seated person, which may be inclined rearward by the momentum produced by the backside collision.

Specifically, the above-described formed wire 21 is formed by folding and bending a single wire member into a frame-like shape for contacting with the back portion or the waist portion of the seated person. Further, upper ends of the formed wire 21 arranged on the left and right sides are attached to an upper reinforcement plate 2U extending between the both side frames Fs by clips Cr such that the upper ends can move only in a height direction or a vertical direction.

Further, the formed wire 21 is held in a position for contacting with a cushioning pad (not illustrated) arranged on a front side thereof because a lower frame-like portion of the formed wire 21 is normally pushed forwardly by biasing forces of bent springs 2T interleaved between the formed wire 21 and a lower reinforcement plate 2D. Here, the rear end portions of the bent springs 2T are respectively engaged with cut-to-rise portions Dc formed by cutting and rising portions of the lower reinforcement plate 2D, and the front end portions of the bent springs 2T are integrally coupled and fixed to the frame shape portion of the formed wire 21.

Therefore, the formed wire 21 can resiliently support the back portion of the seated person while the formed wire 21 deforms as it is pushed rearwardly about upper fulcrum points (support points by the clips Cr) by a load applied by the seated person who leans on the seat back 2.

Figure 3:
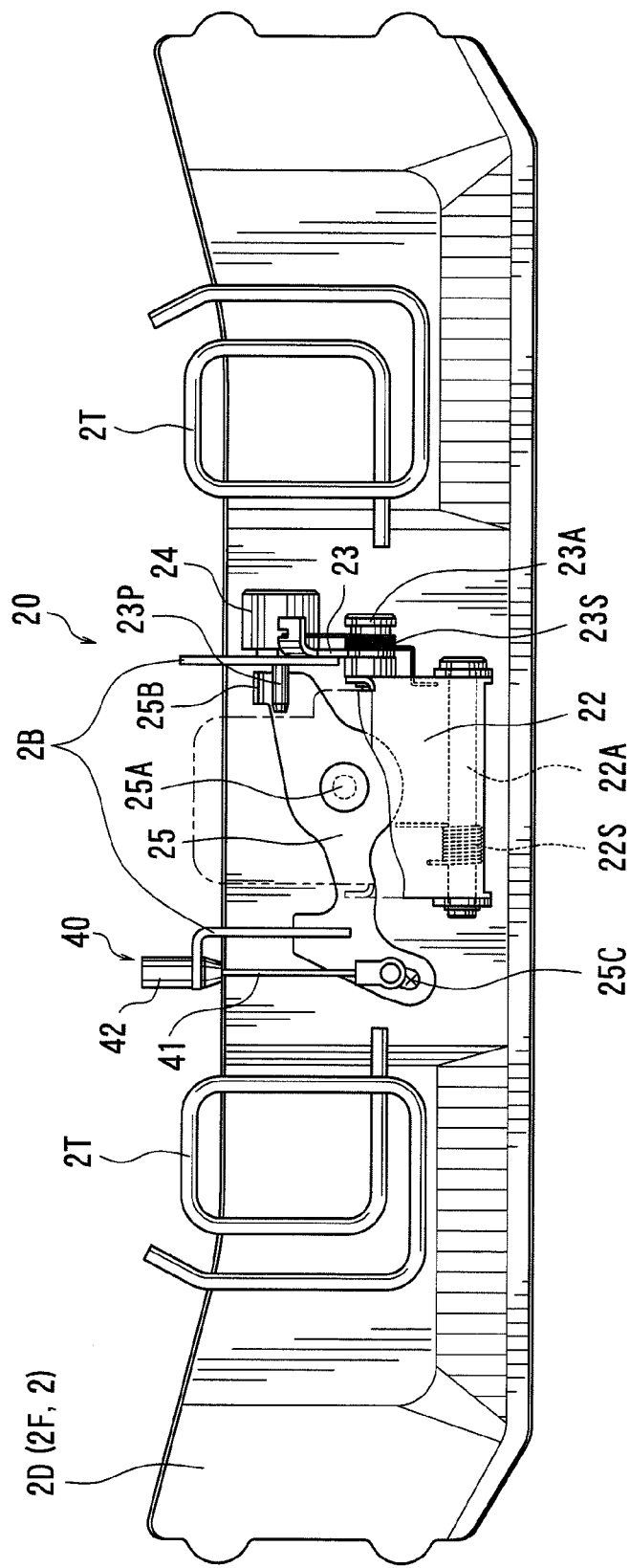
FIG. 3 is a front view showing an initial position of a pressure receiving mechanism for detecting the backside collision of the headrest operating device.
Figure 4:
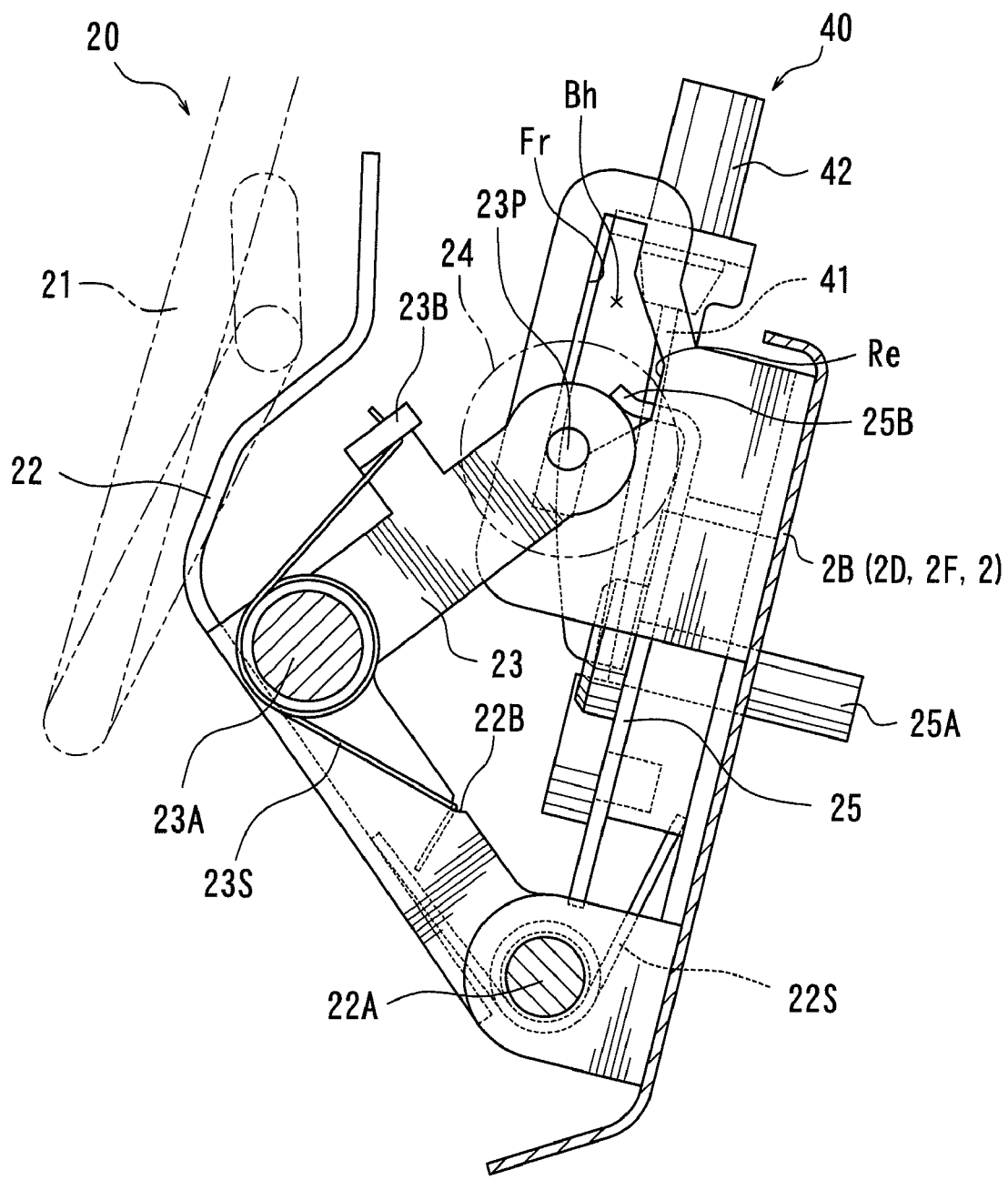
FIG. 4 is a schematic side view showing the initial position of the pressure receiving mechanism.

Next, as shown in FIG. 3 and FIG. 4, the pressure receiving plate 22 is arranged such that its face is oriented toward the front side of the seat back 2, and a lower end portion of the pressure receiving plate 22 is rotatably connected to the above-described base plate 2B by a connecting shaft 22A. As shown in FIG. 4, the pressure receiving plate 22 is normally forced in a rotational direction for tilting forwardly in the counterclockwise direction by a biasing force of a torsional spring 22S wound around the connecting shaft 22A.

Figure 5:
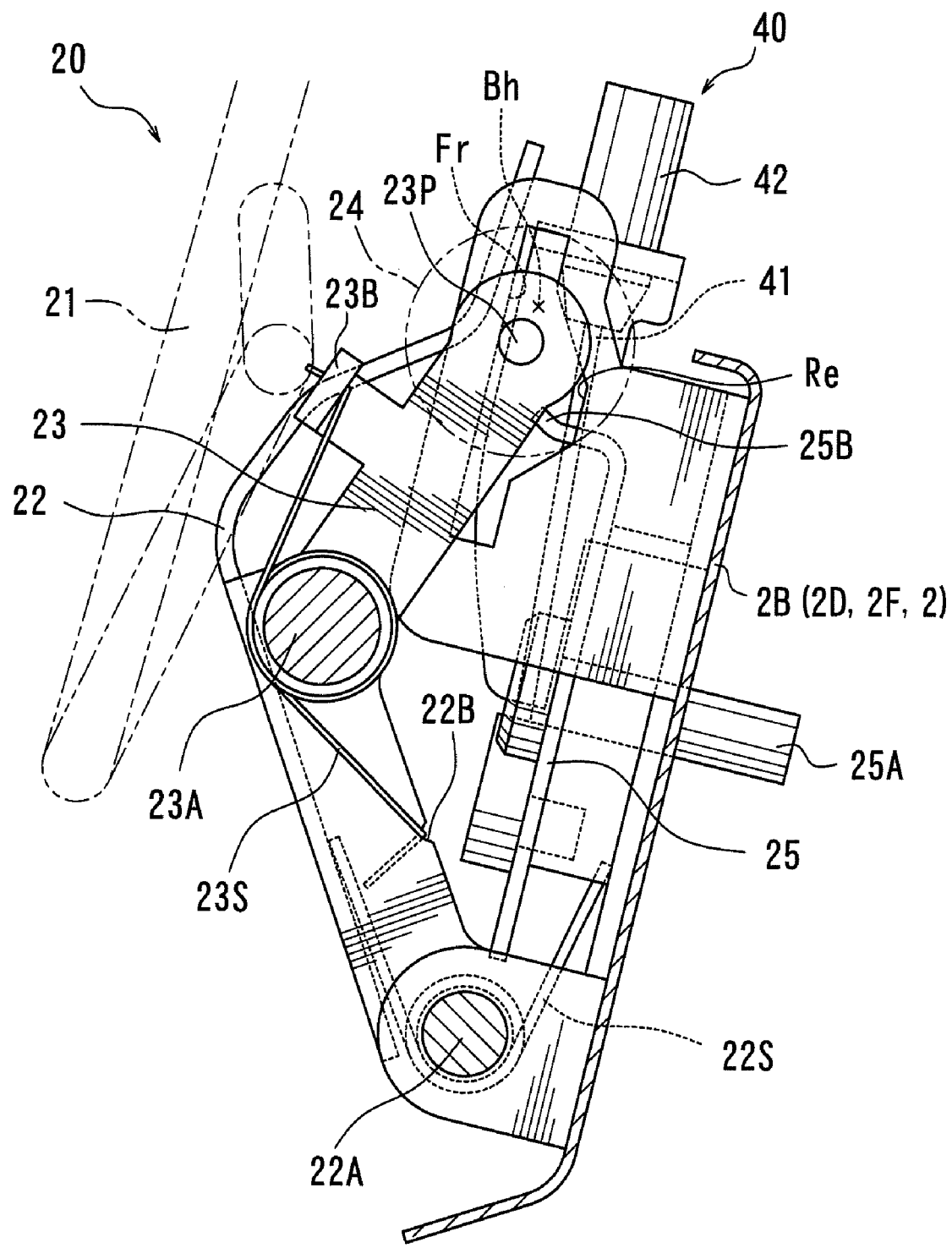
FIG. 5 is a side view showing the operation of the pressure receiving mechanism when a leaning load is applied to a backrest under a normal condition.
Figure 6:
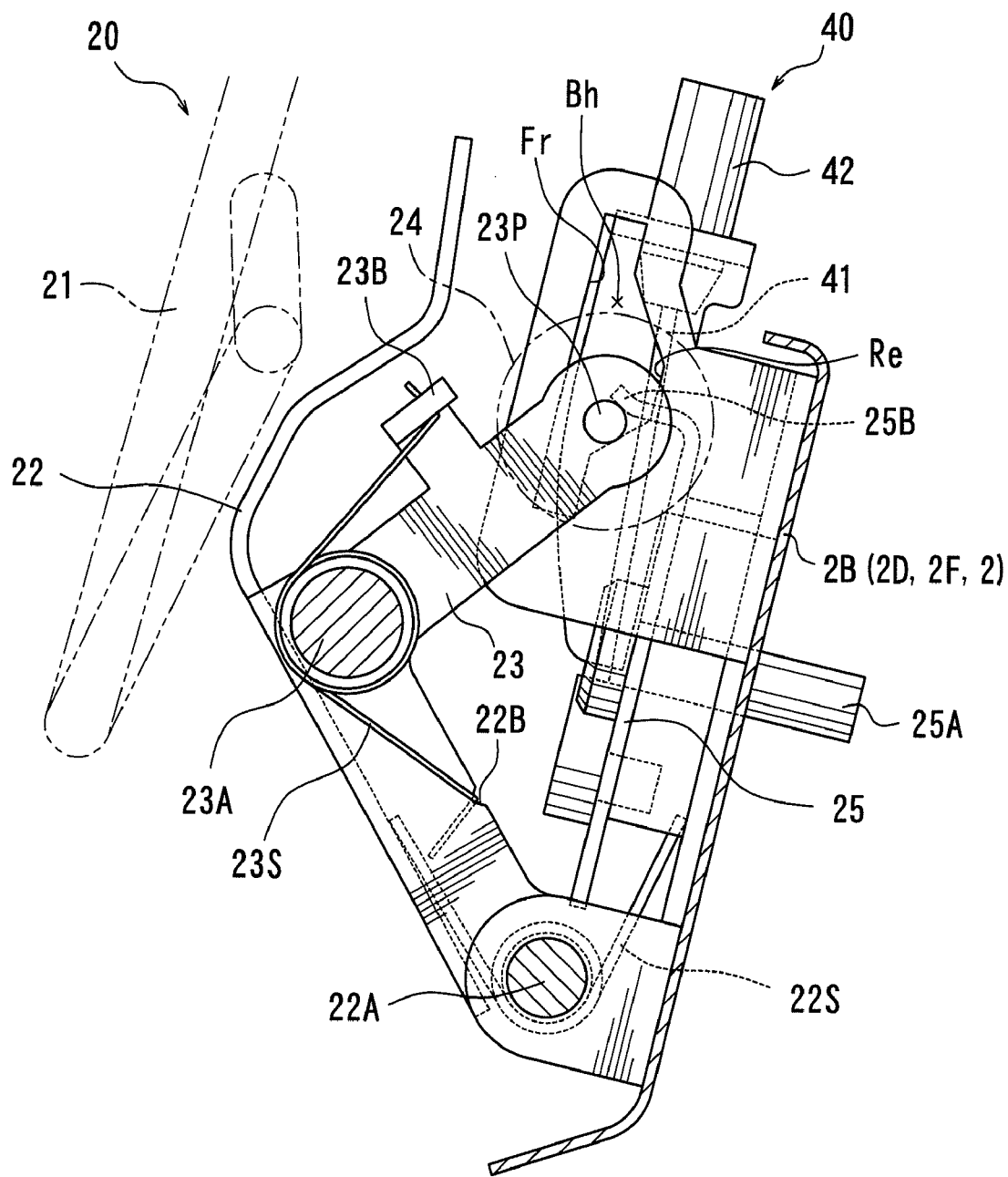
FIG. 6 is a side view showing the operation of the pressure receiving mechanism when a leaning load is applied to the backrest at the occurrence of the backside collision.
Figure 7:
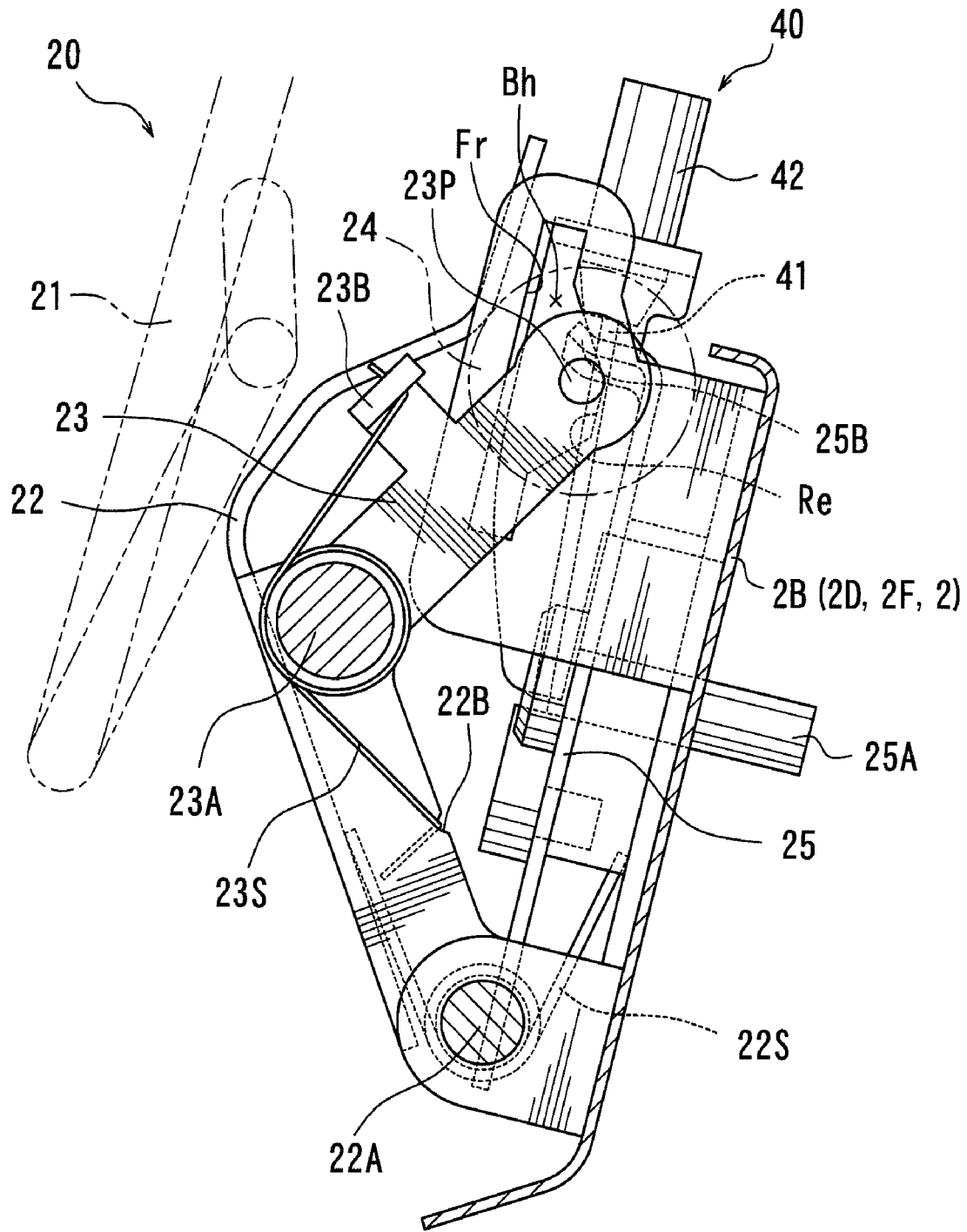
FIG. 7 is a side view showing the operation of pulling an operation cable of the backrest operating device.

Therefore, the pressure receiving plate 22 is maintained in a state where it contacts with the cushion pad (not illustrated) arranged on the front side thereof as it is pushed forwardly. Further, the torsional spring 22S is assembled in a previously twisted state, one end of the torsional spring 22S is engaged by a front face portion of the base plate 2B, and the other end thereof is engaged by a back face (rear face) of the pressure receiving plate 22. Therefore, as shown in FIG. 5 through FIG. 7, the pressure receiving plate 22 is pushed toward the rear side about a fulcrum (connecting shaft 22A) on a lower side thereof by a load of the seated person who leans on the seat back 2.

Further, referring back to FIG. 4, a connecting arm 23 is connected between the pressure receiving plate 22 and the base plate 2B and can slide along the base plate 2B to follow the movement of the pressure receiving plate 22 that is pushed to pivot toward the rear side. Here, the connecting arm 23 serves as an interlocking member. The connecting arm 23 is connected to the pressure receiving plate 22 by a connecting shaft 23A and can rotate about an axis. In addition, the connecting arm 23 is connected to the base plate 2B by a slide pin 23P such that it can slide and rotate within an elongated through hole Bh having a configuration elongated in a vertical direction. Here, the slide pin 23P serves as an engaging member.

Further, in the state where the pressure receiving plate 22 is held at the initial position, the connecting arm 23 is held to take a position inclined upwardly to the right in which a point of connection with the base plate 2B (slide pin 23P) is positioned higher than a point of connection with the pressure receiving plate 22 (connecting shaft 23A). Further, at this occasion, the point of connecting between the connecting arm 23 and the base plate 2B (slide pin 23P) is positioned within a lower end portion of the elongated hole Bh.

Here, the connecting arm 23 is normally urged in a rotational direction for tilting forwardly in the counterclockwise direction relative to the pressure receiving plate 22 by a biasing force of a torsional spring 23S wound around the connecting shaft 23A. Therefore, the slide pin 23P is held normally in a state where it is pressed against a front face Fr of an inner peripheral face of the elongated hole Bh. Here, the position of the pressure receiving plate 22 shown in FIG. 4 is taken when the pressure receiving plate 22 is pushed and moved by the seated person who leans on the seat back 2 in an ordinarily manner.

As shown in FIG. 4, the elongated hole Bh formed in the base plate 2B has a configuration in which a middle portion of the elongated hole Bh has a width widened in a left and right direction in FIG. 4 (front and rear direction). Further, a lower end portion of the elongated hole Bh has a width narrowed in the left and right direction in FIG. 4 (front and rear direction) toward the side of the front face Fr in comparison with the width of the middle portion. Further, a rear face Re of a width changing portion positioned between the middle portion and the lower end portion of the elongated hole Bh is formed as an inclined face, and therefore, the width changes smoothly at the width changing portion.

As shown in FIG. 4, when the pressure receiving plate 22 is pushed to move slightly rearward by the back leaning load of the seated person, the slide pin 23P of the connecting arm 23 is brought to take a position where the slide pin 23P is slightly slid upward from the lower end portion of the elongated hole Bh. Further, as shown in FIG. 5, when the pressure receiving plate 22 is pushed to move rearward by a stronger force, for example, in the case that a person having a large physical constitution is seated, the slide pin 23P is slid further upward to follow the rotation of the connecting arm 23.

At this occasion, the slide pin 23P is slid upward while maintaining the contacting state with the front face Fr within the elongated hole Bh by the biasing force of the torsional spring 23S interleaved between the above-described connecting arm 23 and the pressure receiving plate 22. However, as shown in FIG. 6 and FIG. 7, when the pressure receiving plate 22 is pushed to move rearward by the occurrence of the backside collision, the slide pin 23P is slid upward while maintaining the pressing state against the rear face Re of the elongated hole Bh as it is moved reward against the biasing force of the torsional spring 23S by receiving the inertia movement of a weight 24 attached to the slide pin 23P.

Here, referring back to FIG. 3, a pivoting plate 25 in a shape of an elongated plate is rotatably connected to the above-described base plate 2B by a connecting shaft 25A. The pivoting plate 25 has a right arm portion and a left arm portion. The right arm portion is formed with a receiving portion 25B folded in a plate thickness direction. The left arm portion is formed with an elongated hole 25C, within which a lower end portion of the inner cable 41 of the operation cable 40 engages. Here, the operation cable 40 has a double structure in which the inner cable 41 in a shape of a linear solid cable that is more flexible than the outer cable 42 is inserted into the outer cable 42 in a shape of a tubular flexible cable.

Further, a lower end portion of the outer cable 42 is engaged with and fixed to the base plate 2B, and the lower end portion of the inner cable 41 is engaged with and fixed to an elongated hole 25C formed in the above-described pivoting plate 25. Therefore, the operation cable 40 is operated to be pulled in such a manner that the inner cable 41 is pulled out from the lower end portion of the outer cable 42 by the movement of the pivoting plate 25 that is operated to rotate in the counterclockwise direction about the connecting shaft 25A as shown in FIG. 3.

Further, in FIG. 4, the operation for rotating the pivoting plate 25 in the counterclockwise direction is carried out in accordance with the sliding movement of the above-described slide pin 23P within the elongated hole Bh caused due to the backside collision. Specifically, the receiving portion 25B formed at the above-described pivoting plate 25 is normally held in a position extending to be exposed within the elongated hole Bh. Here, referring back to FIG. 3, the pivoting plate 25 is normally maintained in the initial rotational position shown in FIG. 3 due to connection with the inner cable 41 because an amount of pulling out the inner cable 41 from the outer cable 42 is limited at the upper end portion of the operation cable 40.

As shown in FIG. 5, the receiving portion 25B of the pivoting plate 25 does not interfere with the slide pin 23P and does not carry out any operation since the slide pin 23P is slid on an inoperative path along the front face Fr of the elongated hole Bh even in the event that the pressure receiving plate 22 is pushed to move to the rear side under the normal condition without occurrence of the backside collision. However, as shown in FIG. 6 and FIG. 7, when the pressure receiving plate 22 is pushed to move to the rear side due to occurrence of backside collision, the receiving portion 25B is pushed to move by the slide pin 23P since the slide pin 23P is slid on an operative path along the rear face Re of the elongated hole Bh in accordance with the inertia movement of the weight 24.

Figure 8:
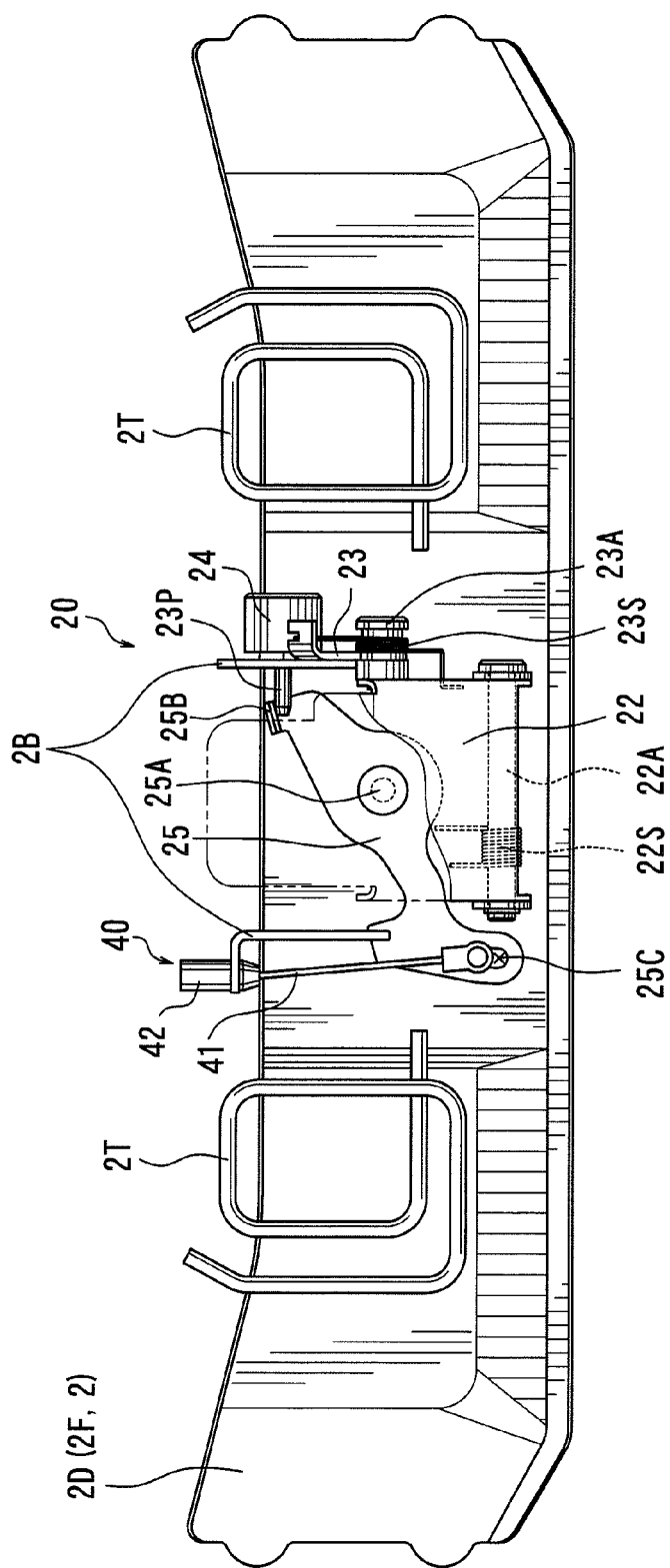
FIG. 8 is a front view showing the operation of pulling the operation cable.

Therefore, as shown in FIG. 8, the operation cable 40 is operated in such a manner that the inner cable 41 is pulled out from the lower end portion of the outer cable 42 by the rotation of the pivoting plate 25 in the clockwise direction. Further, the operation movement amount of the pulled inner cable 41 is transmitted to the push rod 50 as an operation movement amount for pushing the push rod 50 in FIG. 2, so that the headrest 4 is operated to move.

Next, a structure of transmitting the operating force from the operation cable 40 to the push rod 50 will be explained. The operation cable 40 is wired within the seat back 2, and a wiring position is fixed by a bundling band B that can bundle the operation cable 40 together with the formed wire 21. Further, as shown in FIG. 2, an upper end portion of the operation cable 40 is inserted into the tubular support 2S from its lower side, so that the operation cable 40 is capable of pushing the push rod 50 within the stay 4B inserted into the tubular support 2S from its upper side.

Here, the operation cable 40 has engaging projections 41P projecting in a T-like shape and formed at the upper end portion of the inner cable 41. The engaging projections 41P extend radially outward through elongated holes 42S formed to penetrate a peripheral wall of an upper end of the outer cable 42, respectively. Therefore, the inner cable 41 can move in an axial direction relative to the outer cable 42 within a range in which the engaging projections 41P projecting in the T-like shape can move in an axial direction along the elongated holes 42S. The engaging projections 41P as well as the elongated holes 42S are formed at two positions along the circumferential direction of the inner cable 41 and the outer cable 42 and are positioned to be symmetrical.

Figure 9:
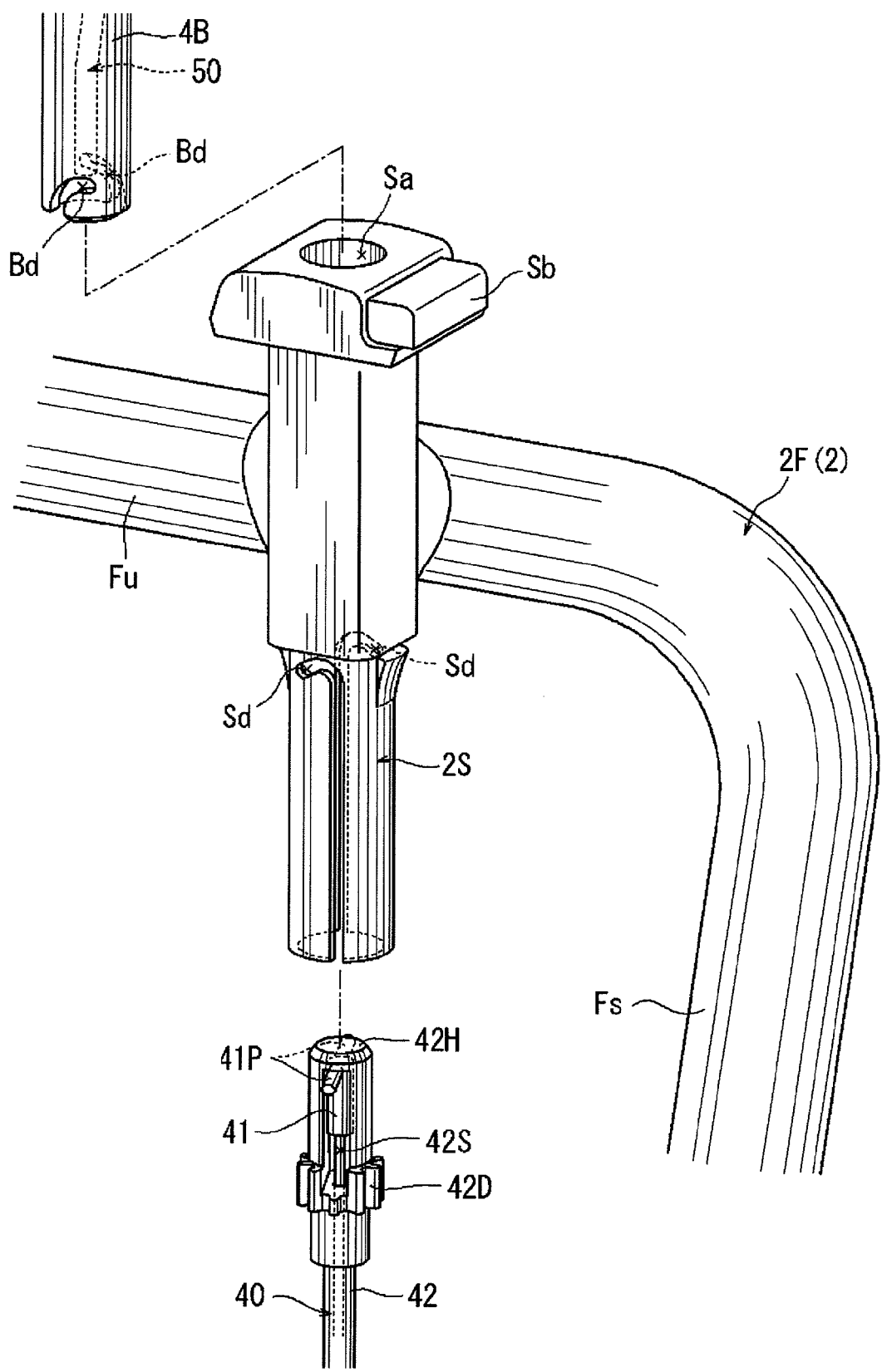
FIG. 9 is an exploded perspective view showing the operation for inserting the operation cable and a stay.

Further, the upper end portion of the outer cable 42 is formed with a head portion 42H in a shape of closing the open end portion of the inner space of the outer cable 42. As shown in FIG. 9, the operation cable 40 can be temporally held in a downwardly suspended state at the upper end portion by the tubular support 2S when the upper end portion of the operation cable 40 is inserted into the tubular support 2S (refer to FIG. 10). By inserting the stay 4B into the support 2S from the upper side in the suspended state of the operation cable 40, the operation cable 40 is shifted from the state suspended by the support 2S to a state suspended by the stay 4B.

Further, because the operation cable 40 is brought to the state suspended by the stay 4B in this way, the operation cable 40 can reversely transmit an operation force (operation movement amount) of pulling from the lower end side to the push rod 50 inserted into the stay 4B as a push operation force (push operation amount). That is, the operation cable 40 and the push rod 50 are brought into a state coupled to each other to enable transmission of the operation force to each other.

An explanation will be given to a connecting structure of connecting the above-described operation cable 40 and the push rod 50 to enable transmission of the operation force to each other. Here, as shown in FIG. 9, a peripheral wall of the support 2S is formed with insertion holes Sd each extending in a slit-like shape in an axial direction from the lower end to the upper end of the peripheral wall. The insertion holes Sd are formed at two positions along the circumferential direction of the support 2S and positioned to be symmetrical with respect to the axis of the support 2S.

The insertion holes Sd can receive the respective engaging projections 41P formed on the inner cable 41 described above as the operation cable 40 is inserted into the support 2S. Here, the upper end portions defining terminal end portions of the insertion holes Sd are bent in left and right directions, respectively, that may correspond to the circumferential direction of the support 2S.

Specifically, the terminal end portion of the insertion hole Sd indicated by a solid line in FIG. 9 is bent leftward. The terminal end portion of the insertion hole Sd indicated by a chain line is bent rightward and is symmetrical with the insertion hole Sd indicated by the solid line. Here, the shapes of the terminal end portions of the insertion holes Sd are formed to extend obliquely downward from a horizontal plane. Therefore, when the engaging projections 41P are inserted into the insertion holes Sd and positioned at the terminal end portions of the insertion holes Sd, the engaging projections 41P (operation cable 40) can be held in a state suspended from the support 2S and incapable of dropping by the weight of the operation cable 40.

Here, the upper end portion of the outer cable 42 is formed by a synthetic resin, and a middle portion thereof is formed with a guide portion 42D that is radially outwardly bulged. The guide portion 42D has a serration-like shape with alternate concave and convex potions arranged in the circumferential direction and an outer diameter of the guide portion 42D is set to be matched with an inner diameter of the support 2S. Therefore, when the operation cable 40 is inserted into the tubular support 2S, the guide portion 42D gently follows the configuration of the inner circumference of the support 2S, and the operation cable 40 can be smoothly inserted without being rattled.

Figure 10:
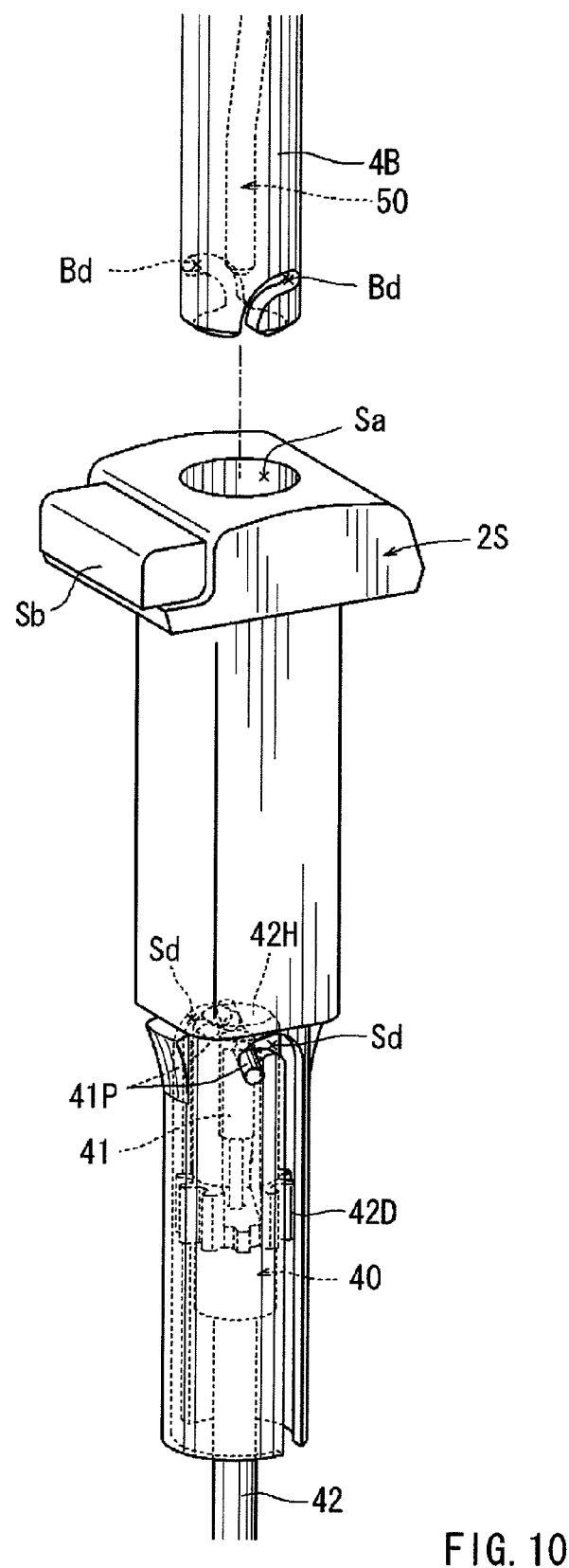
FIG. 10 is a perspective view showing the state where the operation cable is inserted into a support.
Figure 11:
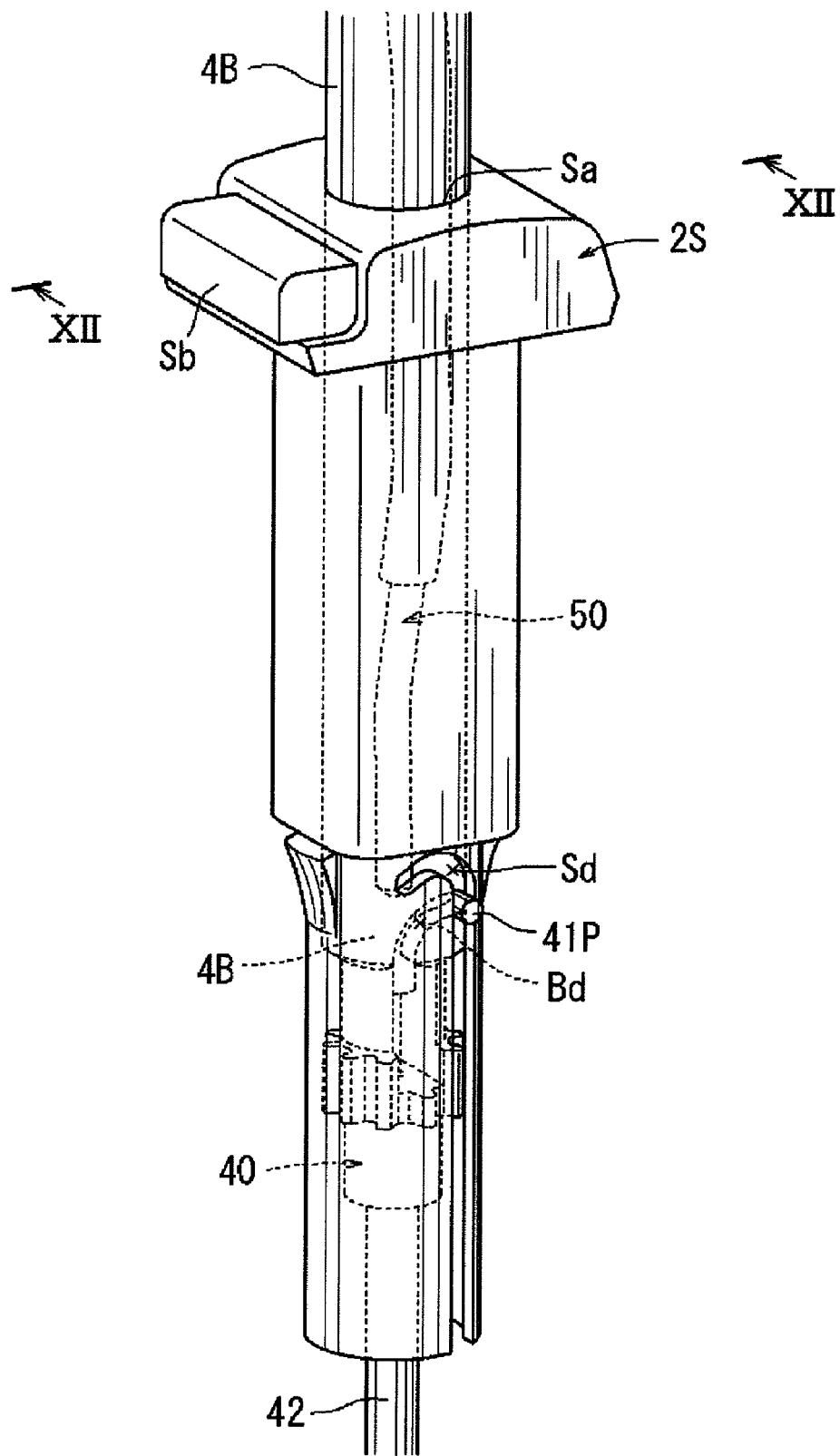
FIG. 11 is a perspective view showing the state where the stay is inserted into the support.

On the other hand, as shown in FIG. 10, a peripheral wall of the stay 4B inserted into the support 2S from the upper side has receiving holes Bd each extending upwardly in a slit-like shape in an axial direction from a lower end portion of the peripheral wall. The receiving holes Bd are formed at two portions along the circumferential direction of the stay 4 and are symmetrical with each other with respect to the axis of the stay 4B. When the stay 4B is inserted into the tubular support 2S from the upper side, the receiving holes Bd can receive the respective engaging projections 41P of the inner cable 41 suspended downwardly within the support 2S.

Further, when the stay 4B is inserted further into the support 2S, the engaging projections 41P move upward in accordance with the shapes of the respective receiving holes Bd. Here, the upper end portions defining the terminal end portions of the receiving holes Bd are bent in directions opposite to bending directions of the respective insertion holes Sd formed in the support 2S.

Further, the receiving holes Bd are bent in the circumferential direction such that their orientations gradually and smoothly changed from the axial direction to the horizontal direction. Therefore, when a push operation force is applied in the axial direction for inserting the stay 4B into the support 2S, the receiving holes Bd enables the respective engaging projections 41P disposed within the support 2S to smoothly move to positions within the terminal end portions of the receiving holes Bd that are oriented substantially horizontally.

Therefore, by inserting the stay 4B into the support 2S, the engaging projections 41P moves to return m the circumferential direction away from the terminal end positions of the insertion holes Sd of the support 2S while being guided by the bent shapes of the respective receiving holes Bd formed in the stay 4B. Further, by further continuing the insertion movement of the stay 4B, the engaging projections 41P, 41P are brought to reach the bent terminal end positions of the respective receiving holes Bd of the stay 4B and to return to positions within axially extending hole portions of the respective insertion holes Sd of the support 2S.

Therefore, the engaging projections 41P, 41P are shifted from the state suspended by the support 2S to the state suspended by the stay 4B. Hence, the engaging projections 41P are brought into a state where the engaging projections 41P are prevented from moving in the axial direction relative to the stay 4B but are permitted to move in the axial direction relative to the support 2S. At this occasion, the engaging projections 41P are positioned within the axially extending hole portions of the respective insertion holes Sd, and therefore, the engaging projections 41P are prevented from moving in the circumferential direction relative to the support 2S.

Therefore, the engaging projections 41P are held within the terminal end positions of the respective receiving holes Bd. Further, the stay 4B can move in the axial direction relative to the support 2S as the stay 4B is connected with the inner cable 41 to be able to move together therewith in the axial direction.

Figure 12:
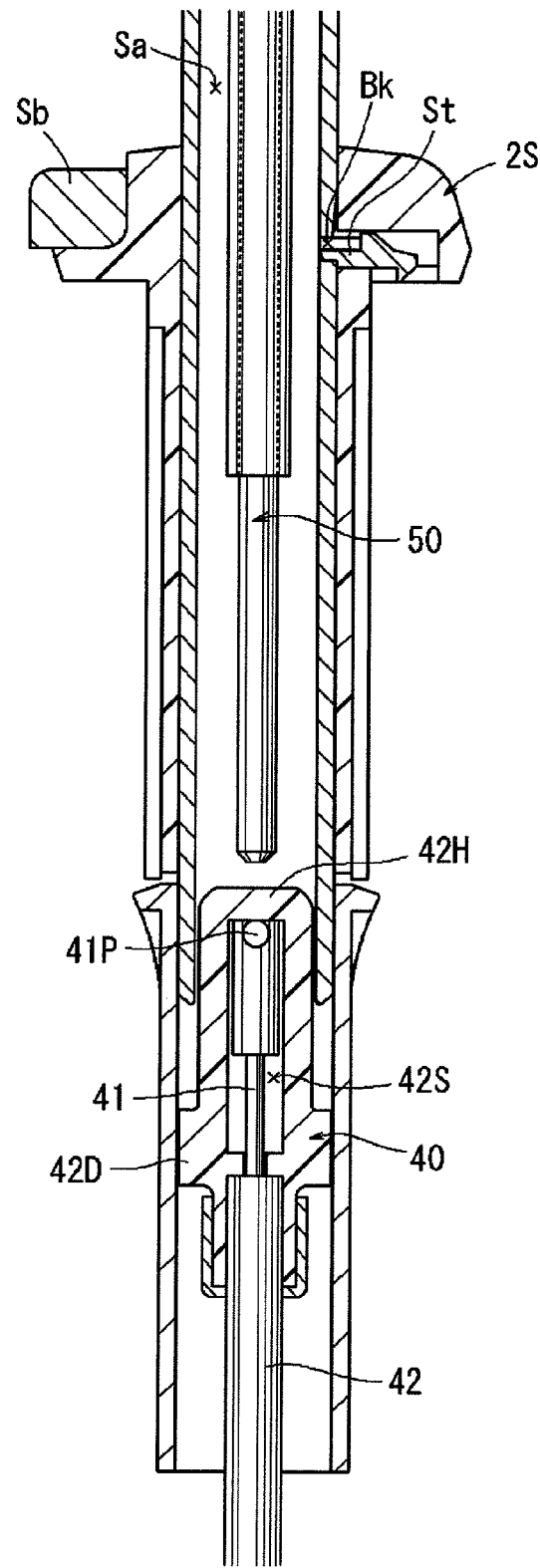
FIG. 12 is a sectional view taken along line XII-XII in FIG. 11.

Here, as shown in FIG. 12, a locking claw St in a plate-like shape is disposed within an insertion hole Sa of the support 2S and is engageable with an engaging groove Bk formed in an outer peripheral wall of the stay 4B. The locking claw St is normally urged to be held in a state projecting into the insertion hole Sa. The locking claw St can move out of the insertion hole Sa by a pushing operation of a knob Sb in a transverse direction.

Therefore, as the stay 4B is inserted into the insertion hole Sa, the engaging groove Bk is brought to be opposed to the locking claw St, so that the locking claw St can engage the locking groove Bk by the urging force. Therefore, the movement of the stay 4B in the inserting direction can be restricted. This restricting state can be released by removing the looking claw St from the engaging groove Bk by the pushing operation of the knob Sb.

A plurality of the engaging grooves Bk may be formed in the stay 4B and arranged in the axial direction. With this arrangement, the installation height of the headrest 4 can be freely adjusted by operating the knob Sb. Further, when the lower end portion of the stay 4B and the upper end portion of the inner cable 41 are connected to each other in the axial direction by the operation of inserting the stay 4B, a state where the head portion 42H of the outer cable 42 is inserted into the stay 4B from a lower side is resulted.

Therefore, as shown in FIG. 12, a lower end portion of the push rod 50 inserted into the stay 4B and the head portion 42H of the outer cable 42 are brought to be proximate to each other in the axial direction. Further, a small gap may be formed between the lower end portion of the push rod 50 and the head portion 42H. With this small gap, the push rod 50 can be prevented from being accidentally pushed by the head portion 42H of the outer cable 42 during the operation for inserting the stay 4B.

Further, when the head portion 42H of the outer cable 42 and the lower end portion of the push rod 50 are positioned to be proximate to each other in the axial direction, as described above with reference to FIG. 2, the operation force produced by pulling the operation cable 40 on the lower end side is transmitted reversely from the head portion 42H of the outer cable 42 to the push rod 50 as the push operation force. This is because the upper end portion of the inner cable 41 of the operation cable 40 is connected to the stay 4B in the axial direction by the above-described operation of inserting of the stay 4B.

Further, the upper end portion (head portion 42H) of the outer cable 42 can move in the axial direction relative to the inner cable 41. Therefore, by pulling the inner cable 41 on the lower side, in accordance with the operation movement amount of pulling the inner cable 41, the upper end portion of the outer cable 42 is pushed upward relative to the upper end portion of the inner cable 41 that is connected with the stay 4B.

Therefore, as shown in FIG. 2, when the backside collision occurs, the operation force of pulling the operation cable 40 can be transmitted as the push operation force to the push rod 50 positioned within the stay 4B, and the releasing member 15 can be operated for releasing the lock condition of the headrest moving mechanism 10.

Meanwhile, referring back to FIG. 1, the headrest 4 can be removed from the seat back 2 by pulling the stays 4B out from the supports 2S. As the stays 4B are pulled out, the connecting state between the inner cable 41 and the stay 4B mentioned above can be released. Specifically, as is best shown in FIG. 10, when the stay 4B is pulled upward out from the support 2S, the engaging projections 41P move in the circumferential direction under the guide of the bent shapes of the respective insertion holes Sd of the support 2S.

Therefore, the engaging projections 41P, 41P return from the state held at the terminal end positions of the respective receiving holes Bd in a direction away from the terminal end positions, reach the terminal end positions of the respective insertion holes Sd under the guide of their bent shapes, and return to the axially extending hole portions of the respective receiving holes Bd. Therefore, as shown in FIG. 10, the engaging projections 41P return from the state suspended by the stay 4B to the state suspended by the support 2S. Further, the axially connected state between the head portion 42H of the outer cable 42 and the push rod 50 is released.

Figure 16:
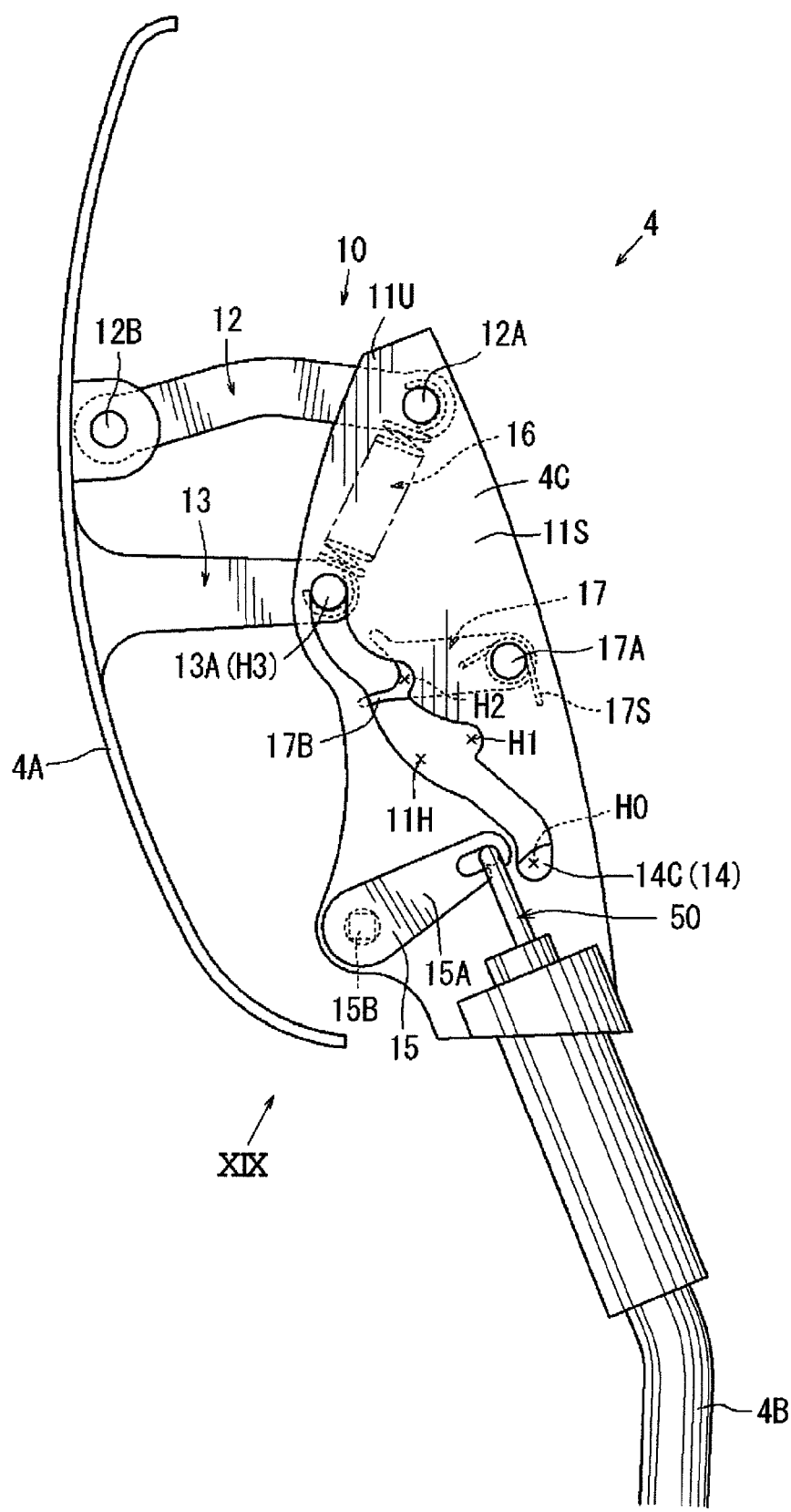
FIG. 16 is a side view showing the state where the headrest is moved to a collision accommodating position.

Next, the headrest moving mechanism 10 will be explained with reference to FIG. 13 through FIG. 19. Further, the construction of the headrest moving mechanism 10 is best shown in FIG. 16, and therefore, components of the headrest moving mechanism 10 will be explained primarily with reference to FIG. 16. The headrest moving mechanism 10 is configured to be able to move the support portion 4A forward relative to the headrest base portion 4C when the backside collision occurs.

Specifically, the headrest moving mechanism 10 includes a pair of left and right link members 12 connecting the support portion 4A and the headrest base portion 4C, a pair of left and right arm members 13 extending rearward from the support portion 4A, hooks 14 for releasably locking the support portion 4A at an initial position, the releasing member 15 for releasing the lock state achieved by the hooks 14, the tension spring 16 for urging the support portion 4A forward, and lever members 17 for guiding the support portion 4A when the support portion 4A returns to the initial position.

Here, the headrest base portion 4C is formed of a synthetic resin and has a rear face portion 11B, a bottom face portion 11D, both side face portions 11S and an upper face portion 11U each having a plate-like configuration. More specifically, the bottom face portion 11D extends forwardly from a lower edge of the rear face portion 11B. Further, the side face portions 11S extend vertically upward from opposite side portions with respect to a width direction of the headrest base portion 4C. Further, the upper face portion 11U connects between upper edge portions of the side face portions 11S.

Figure 19:
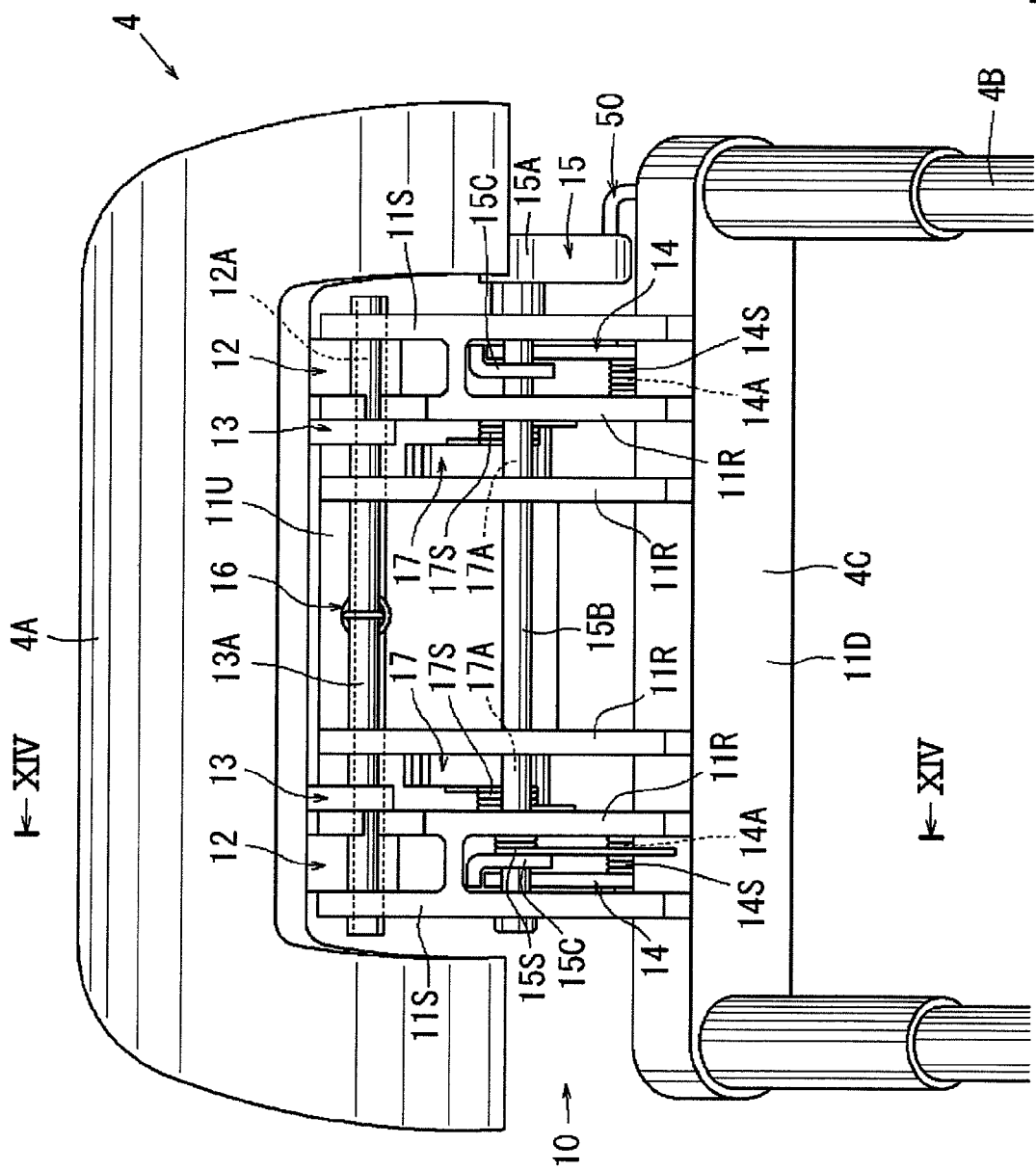
FIG. 19 is a view of the headrest as viewed from a direction indicated by arrow XIV in FIG. 16.

Here, FIG. 19 shows a view as viewed in a direction of arrow XIX in FIG. 16, that is, a view of the headrest 4 as viewed from an obliquely downward front side. As shown in FIG. 19, between the both side face portions 11S of the headrest base portion 4C, a plurality of vertical ribs 11R are form in parallel with the side face portions 11S for reinforcement of the headrest base portion 4C. Further, upper end portions of the stays 4B are inserted into the bottom face portion 11D of the headrest base portion 4C so as to be fixedly joined thereto.

The stays 4B have tubular shapes and have open upper ends. The stays 4B are fixed to the bottom face portion 11D, while the open upper ends of the stays 4B are exposed on the upper side of the bottom face portion 11D. Further, referring back to FIG. 16, the both side face portions 11S of the headrest base portion 4C have elongated holes 11H each formed throughout the thickness of the side face portion 11S and having a wavy shape. Each of the elongated holes 11H is formed with a first stopper groove H1 and a second stopper groove H2 positioned between a lower end portion H0 and an upper end portion H3. The first and second stopper grooves H1 and H2 are recessed toward the rear side (right side in FIG. 16) in a wavy shape.

The pair of link members 12, 12 are formed of a synthetic resin and serve as connecting members for connecting between the headrest base portion 4C and the support portion 4A. The link members 12 are arranged to arranged in a width direction and have respective end portions that are pivotally connected to portions proximate to an upper end side of the headrest base portion 4C and portions on a rear face side of the support portion 4A.

More specifically, rear end portions of the link members 12 are pivotally supported by a connecting shaft 12A extending through and between the side face portions 11S of the headrest base portion 4C. Here, as shown in FIG. 19, each of the rear end portions of the link members 12 connected to the headrest base portion 4C are positioned between the side face portion 11S and the rib 11R.

Further, referring back to FIG. 16, front end portions of the link members 12 for connecting with the support portion 4A are pivotally supported by connecting shafts 12B that are connected to portions on a rear face side of the support portion 4A and extend in a width direction. The connecting shafts 12B extended in a width direction in parallel with each other. As will be understood from FIG. 14, the link members 12 may contact with the upper face portion 11U of the headrest base portion 4C as they pivot in the clockwise direction about the connecting shaft 12A supporting the rear end portions thereof, and therefore, the clockwise pivoting movement of the link members 12 is restricted.

Next, referring back to FIG. 16, the pair of arm members 13 are configured as extended members extending from the rear face portion of the support portion 4A and formed integrally therewith. The arm members 13 are arranged in the width direction of the support portion 4A. Here, the support portion 4A is formed in a shape of a plate curved along its entire length and may be integrally molded by a synthetic resin Further, the rear end portions of the arm members 13 formed with the rear face portion of the support portion 4A are connected to each other by a connecting shaft 13A extending in the width direction.

More specifically, as shown in FIG. 19, the rear end portions of the arm members 13 is positioned between the outer side ribs 11R and the inner side ribs 11R. Further, the connecting shaft 13A connecting between the rear end portions of the arm members 13 is arranged in parallel with the connecting shaft 12A and the connecting shafts 12B.

The both end portions of the connecting shaft 13A are inserted into the respective elongated holes 11H formed in the side face portions 11S of the headrest base portion 4C. Therefore, the connecting shaft 13A can slide in forward and rearward directions and upward and downward directions only within ranges of shapes of the elongated holes 11H. Further, the ribs 11R (see FIG. 19) formed between the side face portions 11S are configured not to interfere with the connecting shaft 13A that may move within the elongated holes 11H.

Figure 14:
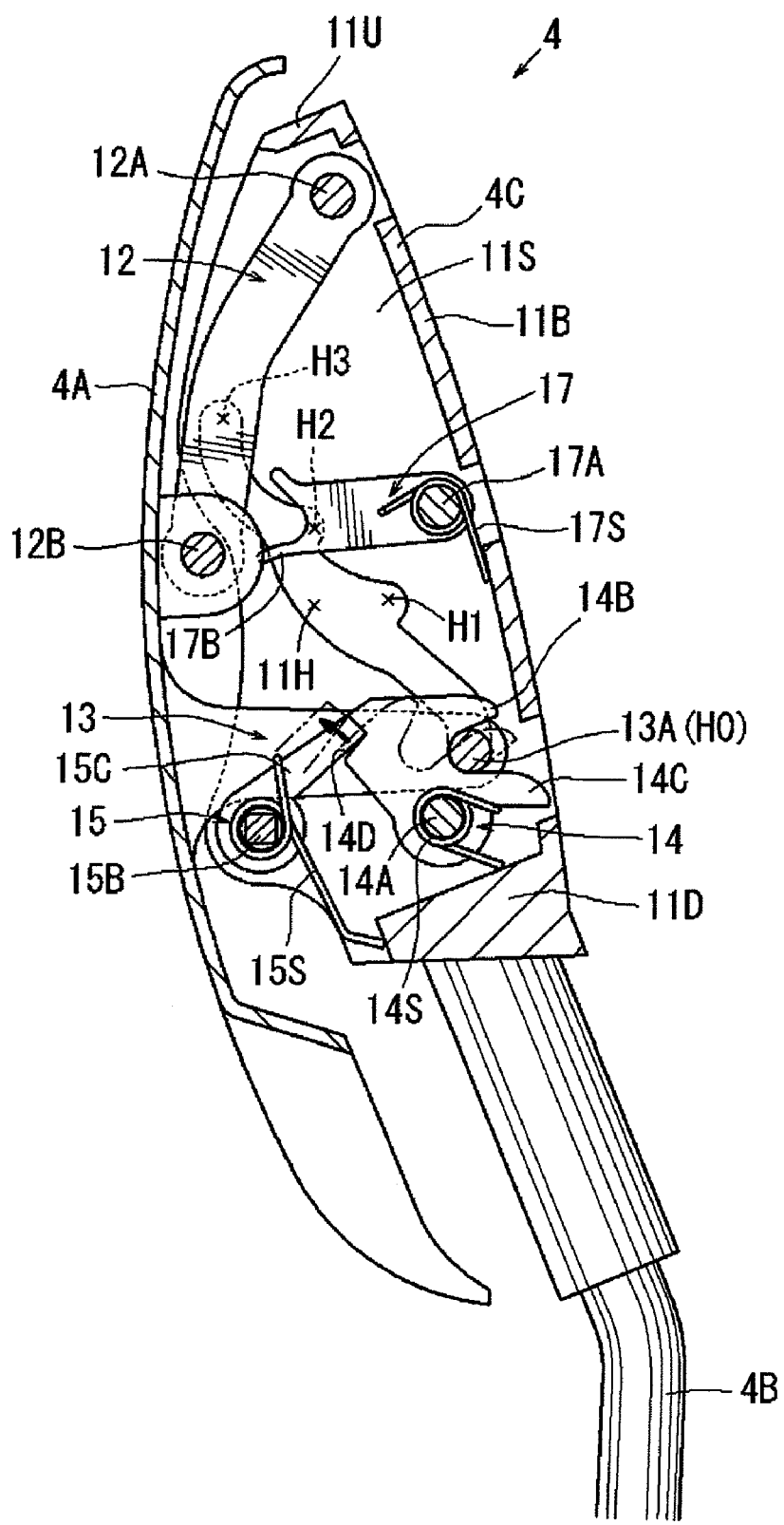
FIG. 14 is a view showing the internal structure of the headrest and is a sectional view taken along line XIV-XIV in FIG. 19.

Next, with reference to FIG. 14, the hooks 14 are formed in a cam shape and arranged in the width direction at positions proximate to a lower end of the headrest base portion 4C. The hooks 14 serve as holding members for holding the connecting shaft 13A at the lower end portions H0 that define the initial position of the connecting shaft 13A. Here, as shown in FIG. 19, the hooks 14 are arranged between the side face portions 11S and the ribs 11R disposed on the inner sides thereof and are pivotally supported by connecting shafts 14A inserted therebetween.

Further, referring back to FIG. 14, at positions along the circumferential direction of outer peripheral edge portion of each hook 14, an upper jaw portion 14B and a lower jaw portion 14C are formed to project radially outward. Therefore, a radially inwardly concaved recess is formed between the upper jaw portion 14B and the lower jaw portion 14C and serves to receive the connecting shaft 13A.

Further, a torsional spring 14S is interleaved between each hook 14 and the headrest base portion 4C. The torsional spring 14S is assembled in a twisted state and urges the hook 14 in the counterclockwise direction from a position shown in FIG. 14. Further, 14, a locking groove 14D configured as a stepped recess is formed in the outer peripheral edge portion of each hook 14.

A pair of engaging arm portions 15C that are components of the releasing member 15 are engaged with and abut to the respective locking grooves 14D of the hooks 14. Therefore, the hooks 14 are normally held not to pivot in the counterclockwise direction irrespective of the biasing force of the torsional springs 14S. Further, in the state where the hooks 14 are prevented from pivoting in the counterclockwise direction, the connecting shaft 13A is received within the recesses formed between the upper jaw portions 14B and the lower jaw portions 14C of the hooks 14, so that the connecting shaft 13A is held to be positioned within the lower end portions HO of the elongated holes 11H.

Here, as shown in FIG. 13, the connecting shaft 13A is urged normally in a direction toward the connecting shaft 12A by a biasing force of the tension spring 16 interleaved between the connecting shaft 13A and the connecting shaft 12A, and therefore, the connecting shaft 13A is urged toward the upper end portions H3 along shapes of the elongated holes 11H. However, the connecting shaft 13A is normally held at the lower end portions H0 of the elongated holes 11H (initial position) by the hooks 14 against the biasing force of the tension spring 16.

Further, referring back to FIG. 14, the hooks 14 can pivot in the counterclockwise direction by the biasing forces of the torsional springs 14S when the engaging arm portions 15C pivot in the counterclockwise direction to release the engagement with the hooks 14. Therefore, as indicated by imaginary lines in FIG. 14, the upper jaw portions 14B of the hooks 14 move to a position outside of the elongated holes 11H (i.e., a position not to oppose to the elongated holes 11H), and the lower jaw portions 14C move to a position exposed to the elongated holes 11H (i.e., a position opposed to the elongated holes 11H) as if they are pushed up from the lower side.

Therefore, the state of locking the connecting shaft 13A by the hooks 14 is released, and therefore, as shown in FIG. 15 and FIG. 16, the connecting shaft 13A moves forwardly upwardly along shapes of the elongated holes 11H by the biasing force of the tension spring 16. Hence, the support portion 4A moves forwardly upwardly relative to the headrest base portion 4C to follow the pivoting movement of the link members 12.

Here, referring back to FIG. 14, the engaging ann portions 15C for preventing the hooks 14 from being pivoted in the counterclockwise direction are arranged in the width direction for engagement with the respective hooks 14. As shown in FIG. 19, similar to the hooks 14, the engaging arm portions 15C are arranged between the side face portions 11S and the ribs 11R disposed on the inner sides.

Further, a connecting shaft 15B extending through and between the side face portions 11S supports the engaging arm portions 15C. The connecting shaft 15B is fixedly connected to the engaging arm portions 15C and is pivotally supported by the side face portions 11S. Further, the connecting shaft 15B is arranged in parallel with the connecting shafts 12A, 12B and the connecting shaft 13A.

Further, a torsional spring 15S is interleaved between one of the engaging arm portions 15C and the headrest base portion 4C. The torsional spring 15S is assembled in a twisted state and urges the engaging arm portions 15C to pivot in the clockwise direction as shown in FIG. 14. Therefore, the engaging arm portions 15C are normally held to be pressed against outer peripheral face portions of the hooks 14, so that the front end portions of the engaging arm portions 15C are held to engage with the locking grooves 14D recessed in a stepped manner of the hooks 14.

In the state where the engaging arm portions 15C are in engagement with the locking grooves 14D, respectively, the engaging arm portions 15C and the hooks 14 are in abutment to each other, and therefore, they mutually prevent the pivotal movement relative to each other against the biasing forces applied to them. Further, as shown in FIG. 14 and FIG. 15, an end portion of the connecting shaft 15B connected to the engaging arm portions 15C is integrally connected with an operating arm portion 15A that can be pivot by the push rod 50.

When backside collision occurs, the operating arm portion 15A pivots in the counterclockwise direction because the push rod 50 is pushed upward. Therefore, as shown in FIG. 14, the operating arm portion 15A operates to pivot the engaging arm portions 15C in the same direction to release the engagement of the engaging arm portions 15C with the hooks 14. Hence, the holding state of the support portion 4A at the initial position is released, and the support portion 4A moves forwardly upwardly by the biasing force of the tension spring 16.

The forward and upward movement of the support portion 4A is stopped when the connecting shaft 13A reaches the upper end portions H3 of the elongated holes 11H as shown in FIG. 16. When the movement of the support portion 4A is stopped, the support portion 4A is prevented from being pushed back toward the rear side even in the case that a load is applied by the head portion of the seated person. That is, when the connecting shaft 13A reaches the upper end portions H3 of the elongated holes 11H, the link members 12 connected to the support portion 4A are brought into contact with the upper face portion 11U of the headrest base portion 4C, so that the link members 12 are prevented from pivoting in the clockwise direction.

Further, in this pivotal movement prevented state, if a force is applied in a direction of pushing the support portion 4A rearward, the link members 12 receive an operation force in such a direction that the link members 12 are pressed against the upper face portion 11U of the headrest base portion 4C. Therefore, the support portion 4A is not pushed back in the counterclockwise direction even if the force described above is applied. Therefore, the support portion 4A can receive the head portion of the seated person while the support portion 4A is positioned at the collision accommodating position. Further, as shown in FIG. 15, during the forward movement of the support portion 4A, the support portion 4A is prevented from being pushed back rearward even in the event that the head portion of the seated person presses the support portion 4A.

Specifically, if a force is applied in a direction of pushing back the connecting shaft 13A rearward during the forward movement the support portion 4A, the connecting shaft 13A moves into the first stopper grooves H1 or the second stopper grooves H2, which are recessed rearward (rightward in the drawings), of the elongated holes 11H so as to be locked therewithin. Therefore, the rearwardly pushing back movement of the connecting shaft 13A can be prevented, and the support portion 4A can be held in a position that is taken during the forward movement.

Therefore, even in the case that the support portion 4A is at a midpoint before reaching the collision accommodating position, the head portion of the seated person can stably be received by the support portion 4A. FIG. 15 shows a state where the connecting shaft 13A enters into the second stopper grooves H2. Here, referring back to FIG. 13, the left and right lever members 17 are disposed at the headrest base portion 4C and each has an arm-like shape.

The lever members 17 are arranged in the width direction, and rear end portions thereof are pivotally supported by the headrest base portion 4C. More specifically, as shown in FIG. 19, the rear end portion of each of the lever members 17 is positioned between the rib 11R positioned on its outer side and the rib 11R positioned on its inner side, and is pivotally supported by a connecting shaft 17A extending through and between the outer and inner ribs 11R.

Further, torsional springs 17S are interleaved between the lever members 17 and the headrest base portion 4C. As shown in FIG. 13, the torsional springs 17S are wound around the connecting shafts 17A, respectively. One end of each of the torsional springs 17S is engaged with the corresponding lever member 17, and the other end thereof is engaged with the headrest base portion 4C. Therefore, the lever members 17 are normally held at positions exposed to (or opposed to) the elongated holes 11H where the biasing forces of the torsional springs 17S are balanced.

Further, the front end portions (left side end portions as viewed in the drawings) of the lever members 17 exposed to (or opposed to) the elongated holes 11H of the respective are respectively formed with receiving portions 17B each having a folk-like shape. As shown in FIG. 15, when the connecting shaft 13A is moved upward from the lower end portions H0 of the elongated holes 11H, the receiving portions 17B move out of the elongated holes 11H in such a manner that they are pushed away by the connecting shaft 13A.

Figure 17:
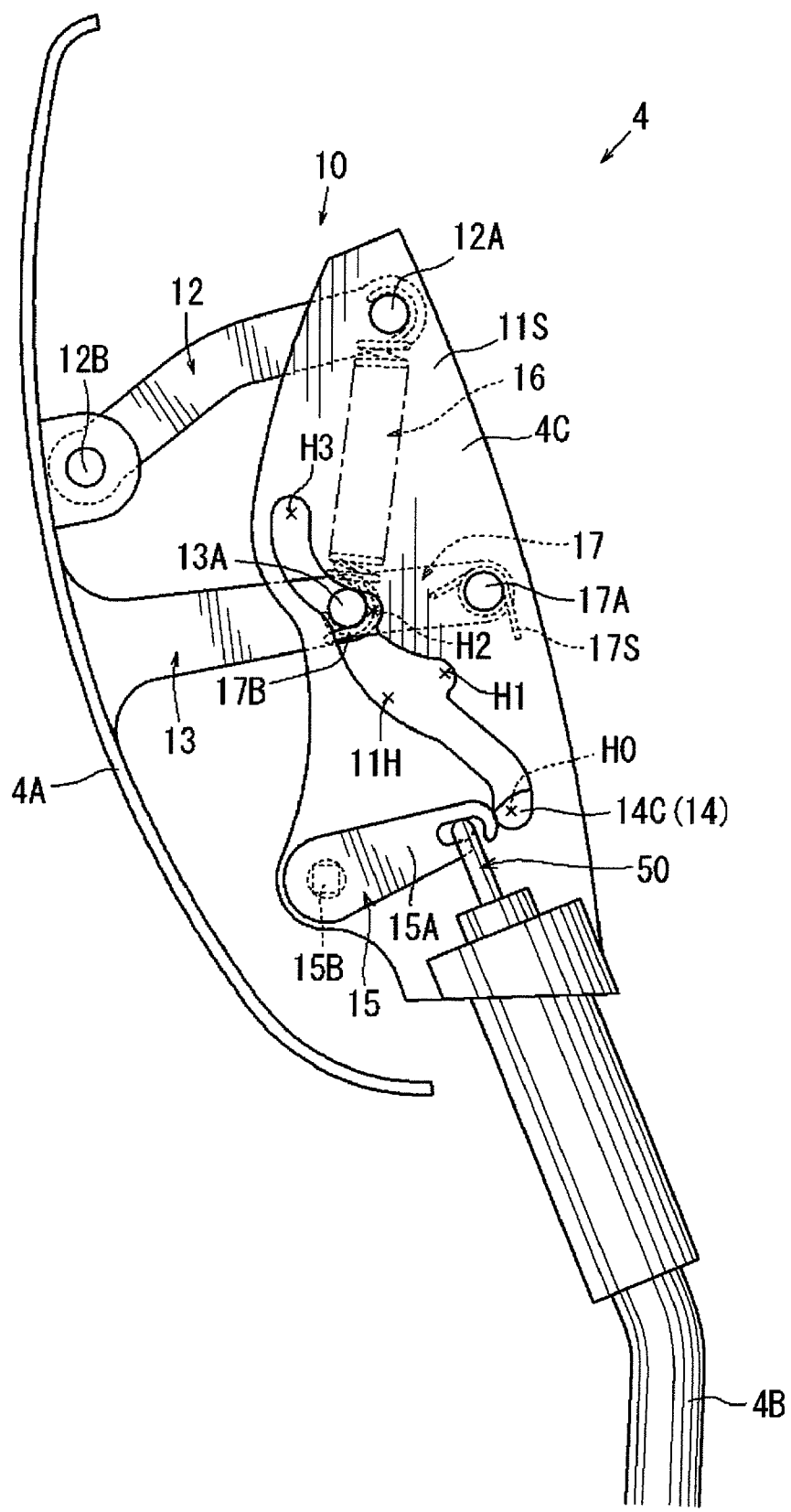
FIG. 17 is a side view showing the state where the headrest is positioned at a midpoint during the movement for returning to the initial position.

However, as shown in FIG. 16, when the connecting shaft 13A reaches the upper end portions 113 of the elongated holes 11H, the receiving portions 17B, 17B are returned to positions where they are exposed to the elongated holes 11H again by the biasing forces of the torsional springs 17S. Further, as shown in FIG. 17, when the connecting shaft 13A is transferred downwardly from the upper end portions H3 toward the elongated holes 11H, the receiving portions 17B can receive and catch the connecting shaft 13A by the fork shaped end portions.

Figure 18:
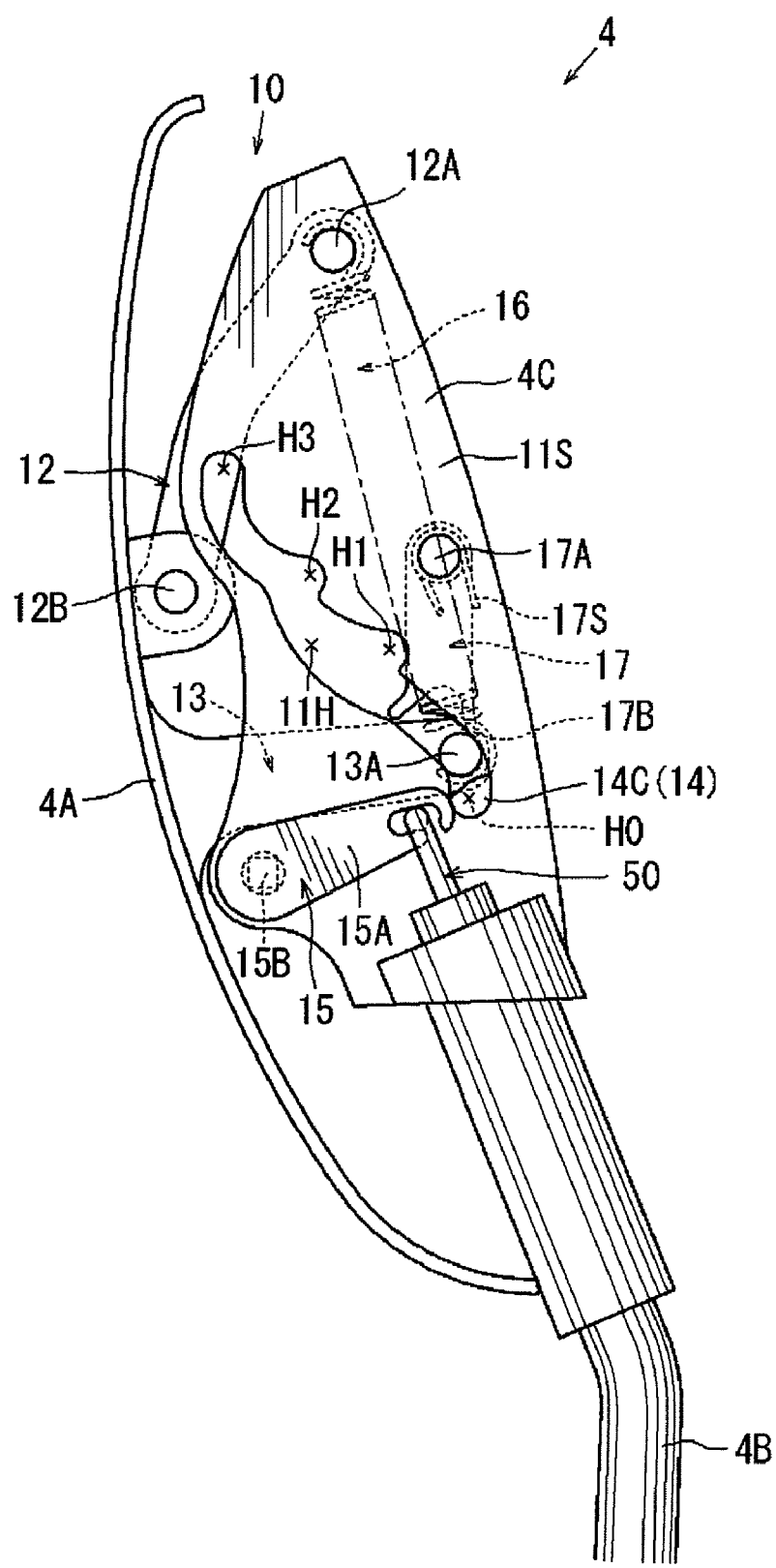
FIG. 18 is a side view showing the state where the headrest moves toward the initial position under the guide of a lever.

As the connecting shaft 13A moves further downward, the lever members 17 are pushed by the connecting shaft 13A caught by the receiving portions 17B and pivots in the counterclockwise direction. Therefore, as shown in FIG. 18, the connecting shaft 13A is transferred to positions proximal to the lower end portions HO while being moved and guided by the lever members 17, and the connecting shaft 13A is then removed from the receiving portions 17B.

In this way, when the connecting shaft 13A is transferred downwardly from the upper end portions H3 along the elongated holes 11H, the connecting shaft 13A is smoothly transferred to the lower end portions H0 while being moved and guided by the lever members 17 without entering the first stopper grooves H1 and the second stopper grooves H2. Further, because the connecting shaft 13A is moved to reach the lower end portions H0 in such a manner that the connecting shaft 13A is pushed into the lower end portions H0, the lower jaw portions 14C of the hooks 14 exposed to (opposed to) the lower end portions H0 are pushed downward by the connecting shaft 13A.

Therefore, as shown in FIG. 14, the hooks 14 are pushed to pivot in the clockwise direction and are brought into a position where the upper jaw portions 14B are positioned on the upper side of the connecting shaft 13A. In this position, the hooks 14 are engaged with the respective engaging arm portions 15C and are locked to hold the connecting shaft 13A again at the initial position (lower end portions H0). Hence, the support portion 4A returns to the initial position and held at this position.

Next, the operation of the above embodiment will be explained. Referring to FIG. 1, the support portion 4A of the headrest 4 is normally held in the initial position when no backside collision occurs. When the backside collision occurs, the pressure receiving mechanism 20 is pushed to move by the back leaning load of the seated person applied to the seat back 2, and this movement of the pressure receiving mechanism 20 is transmitted to the releasing member 15 by way of the operation cable 40 and the push rod 50, so that the releasing member 15 is pivoted.

Therefore, the holding state at the initial position of the support portion 4A is released, and as shown in FIG. 16, the support portion 4A is transferred to the collision accommodating position by the biasing force of the tension spring 16. The support portion 4A moved to the collision accommodating position can receive and support, at an early stage of the back collision, the head portion of the seated person that may be inclined rearward by the momentum produced due to the back collision.

In this way, according to the headrest operating device of the embodiment, when no backside collision occurs, the connecting arm 23 (interlocking member) moves the slide pin 23P on the inoperative path along the front face Fr of the elongated hole Bh even in the event that the connecting arm 23 is moved by the operation of the pressure receiving plate 22. Therefore, when no the backside collision occurs, the operation cable 40 is not operated to be manipulated, and therefore, the headrest 4 may not be accidentally operated.

When the backside collision occurs, the connecting arm 23 moves on the operative path along the rear face Re of the elongated hole Bh in response to the operation of the pressure receiving plate 22. In other words, the connecting arm 23 is brought to interlock with the pressure receiving plate 22. Therefore, the operation cable 40 is operated by the connecting arm 23, so that the headrest 4 is operated. In this way, the connecting arm 23 for operating the operation cable 40 has a function of preventing an accidental operation of the headrest 4, and therefore, necessary space for arrangement can be saved and the headrest operating device may have a compact construction.

The present invention may not be limited to the above embodiment and the above embodiment may be modified in various ways. For example, as disclosed in JP-A-2005-104259, the contents of which is incorporated herein by reference, the headrest moving mechanism can also be constituted such that the support portion 4A of the headrest 4 is operated to move in an advancing direction by an amount in correspondence with a moving amount of the operation cable 40.

Further, although the inertia force of the weight 24 provided at the connecting arm 23 has been used as switching means for switching the operation path of the connecting arm 23 moved in response to the operation of the pressure receiving mechanism 20 (cooperatively moving member) between the path for the non-occurrence of the backside collision and the path for the occurrence of the backside collision, the operation path can be switched by electrically detecting the occurrence of backside collision. For example, the pressure receiving plate 22 and the connecting arm 23 may be connected by a solenoid that normally maintains the positional relationship with regard to a rotational angle between the pressure receiving plate 22 and the connecting arm 23. When the backside collision is detected, the solenoid operates to change the positional relationship between the pressure receiving plate 22 and the connecting arm 23, so that the operation path of the connecting arm 23 can be changed.

Further, the switching means may be configured to switch the operation path of the connecting arm 23 by using a guide portion having different guide paths that are selected between the occurrence and non-occurrence of the backside collision.

What is claimed is:

1. A headrest operating device for moving a headrest toward a head of a person seated on a vehicle seat when a backside collision occurs to a vehicle, comprising:
   a backside collision detecting device disposed within a seat back of the vehicle seat and configured to be able to detect occurrence of the backside collision;
   wherein the backside collision detecting device can produce an operational force upon detection of the occurrence of the backside collision;
   an operation member;
   a headrest including a headrest base portion and a headrest support portion, supported on the vehicle seat by support tubes;
   a headrest moving mechanism coupled to the operation member and configured to move the headrest support portion away from the headrest base portion and toward the head of a seated person based on the operation of the operation member;
   an interlocking member coupled between the backside collision detecting device and the operation member, so that the operational force of the backside collision detecting device can be transmitted to the operation member via the interlocking member; and
   a switching device configured to be able to switch a path of movement of the interlocking member caused by the operational force of the operation member between an inoperative path and an operative path;
   when no backside collision occurs, the interlocking member can move along the inoperative path; and
   when the backside collision occurs, the interlocking member can move along the operative path, so that the operational force of the backside collision detecting device can be transmitted to the operation member.

2. The headrest operating device as in claim 1, wherein:
   the interlocking member includes an engaging member;
   when the interlocking member moves along the operative path, the engaging member is positioned for engagement with the operation member; and
   the switching device comprises a weight attached to the interlocking member, so that the movement path of the interlocking member is switched from the inoperative path to the operative path by an inertia force of the weight.

3. The headrest operating device as in claim 1, wherein the backside collision detecting device comprises a pressure receiving mechanism that can receive a load applied by the seated person when the backside collision occurs.

4. The headrest operating device as in claim 3, wherein the pressure receiving mechanism comprises:
a base plate attached to the seat back; and
a pressure receiving plate mounted to the base plate and pivotable about a first axis relative to the base plate;
the interlocking member comprises a connecting arm connected to the pressure receiving plate and pivotable about a second axis relative to the pressure receiving plate, the second axis being parallel to the first axis.

5. The headrest operating device as in claim 4, wherein:
the interlocking member further comprises a slide pin attached to the connecting arm;
the base plate includes an elongated slot,
the slide pin is inserted into the elongated slot, so that the slide pin can move between a first position and a second position within the elongated slot as the connecting arm pivots about the second axis;
the first position and the second position correspond to the inoperative path and the operative path, respectively.

6. The headrest operating device as in claim 5, wherein:
the operation member comprises a pivoting plate pivotally mounted to the base plate about a third axis and including a receiving portion;
when the slide pin is positioned at the first position, the slide pin is not engageable with the receiving portion, so that the movement of the slide pin is not transmitted to the pivoting plate;
when the slide pin is positioned at the second position, the slide pin is engageable with the receiving portion, so that the movement of the slide pin is transmitted to the pivoting plate.

7. The headrest operating device as in claim 6, wherein the third axis is perpendicular to the first and second axes.

8. The headrest operating device as in claim 6, wherein:
the operation member further comprises an operation cable coupled between the pivoting plate and the pressure receiving mechanism.

9. The headrest operating device as in claim 5, wherein:
the elongated slot has a circumferential surface including a first surface and a second surface;
the slide pin can move along the first surface when the slide pin is positioned at the first position; and
the slide pin can move along the second surface when the slide pin is positioned at the second position.

10. The headrest operating device as in claim 5, further comprising:
a first biasing device constructed to bias the pressure receiving plate, so that the pressure receiving plate can pivot about the first axis against the biasing force of the first biasing device when the load is applied;
a second biasing device constructed to bias the connecting arm toward the first position.

11. The headrest operating device as in claim 4, wherein the switching device comprises a weight mounted to a slide pin.

12. A headrest operating device for moving a headrest of a vehicle seat, comprising:
a headrest moving mechanism configured to move a headrest support portion away from a headrest base portion and toward the head of a seated person;
an actuation device;
a first coupling member capable of being moved by the actuation device;
a second coupling member coupled to the headrest moving mechanism;
a control device configured to be able to shift a moving path of the first coupling member between a first path and a second path;
wherein the movement of the first coupling member is transmitted to the second coupling member when the first coupling member moves along the first path; and
wherein the movement of the first coupling member is not transmitted to the second coupling member when the first coupling member moves along the second path;
wherein:
the first coupling member includes a pin;
the control device includes a control member and a switching member;
the control member has a slot formed therein;
the pin is inserted into the slot;
the switching member is operable to shift the moving path of the pin by moving the pin within the slot; and
wherein the switching member is a weight mounted to the first coupling member.

13. A headrest operating device for moving a headrest toward a head of a person seated on a vehicle seat when a backside collision occurs to a vehicle, comprising:
a backside collision detecting device disposed within a seat back of the vehicle seat and configured to be able to detect occurrence of the backside collision;
wherein the backside collision detecting device can produce an operational force upon detection of the occurrence of the backside collision;
an operation member;
a headrest moving mechanism coupled to the operation member and configured to be able to move the headrest based on the operation of the operation member;
an interlocking member coupled between the backside collision detecting device and the operation member, so that the operational force of the backside collision detecting device can be transmitted to the operation member via the interlocking member; and
a switching device configured to be able to switch a path of movement of the interlocking member caused by the operational force of the operation member between an inoperative path and an operative path;
when no backside collision occurs, the interlocking member can move along the inoperative path; and
when the backside collision occurs, the interlocking member can move along the operative path, so that the operational force of the backside collision detecting device can be transmitted to the operation member
the interlocking member includes an engaging member;
when the interlocking member moves along the operative path, the engaging member is positioned for engagement with the operation member; and
the switching device comprises a weight attached to the interlocking member, so that the movement path of the interlocking member is switched from the inoperative path to the operative path by an inertia force of the weight.

14. A headrest operating device for moving a headrest toward a head of a person seated on a vehicle seat when a backside collision occurs to a vehicle, comprising:
a backside collision detecting device disposed within a seat back of the vehicle seat and configured to be able to detect occurrence of the backside collision;

wherein the backside collision detecting device can produce an operational force upon detection of the occurrence of the backside collision;
an operation member;
a headrest moving mechanism coupled to the operation member and configured to be able to move the headrest based on the operation of the operation member;
an interlocking member coupled between the backside collision detecting device and the operation member, so that the operational force of the backside collision detecting device can be transmitted to the operation member via the interlocking member; and
a switching device configured to be able to switch a path of movement of the interlocking member caused by the operational force of the operation member between an inoperative path and an operative path;
when no backside collision occurs, the interlocking member can move along the inoperative path; and
when the backside collision occurs, the interlocking member can move along the operative path, so that the operational force of the backside collision detecting device can be transmitted to the operation member;
wherein the backside collision detecting device comprises a pressure receiving mechanism that can receive a load applied by the seated person when the backside collision occurs;
wherein the pressure receiving mechanism comprises:
a base plate attached to the seat back; and
a pressure receiving plate mounted to the base plate and pivotable about a first axis relative to the base plate;
the interlocking member comprises a connecting arm connected to the pressure receiving plate and pivotable about a second axis relative to the pressure receiving plate, the second axis being parallel to the first axis.

15. The headrest operating device as in claim 14, wherein:
the interlocking member further comprises a slide pin attached to the connecting arm;
the base plate includes an elongated slot,
the slide pin is inserted into the elongated slot, so that the slide pin can move between a first position and a second position within the elongated slot as the connecting arm pivots about the second axis;
the first position and the second position correspond to the inoperative path and the operative path, respectively.

16. The headrest operating device as in claim 15, wherein:
the operation member comprises a pivoting plate pivotally mounted to the base plate about a third axis and including a receiving portion;
when the slide pin is positioned at the first position, the slide pin is not engageable with the receiving portion, so that the movement of the slide pin is not transmitted to the pivoting plate;
when the slide pin is positioned at the second position, the slide pin is engageable with the receiving portion, so that the movement of the slide pin is transmitted to the pivoting plate.

17. The headrest operating device as in claim 16, wherein the third axis is perpendicular to the first and second axes.

18. The headrest operating device as in claim 16, wherein:
the operation member further comprises an operation cable coupled between the pivoting plate and the pressure receiving mechanism.

19. The headrest operating device as in claim 15, wherein:
the elongated slot has a circumferential surface including a first surface and a second surface;
the slide pin can move along the first surface when the slide pin is positioned at the first position; and
the slide pin can move along the second surface when the slide pin is positioned at the second position.

20. The headrest operating device as in claim 15, wherein the switching device comprises a weight mounted to the slide pin.

21. The headrest operating device as in claim 14, further comprising:
a first biasing device constructed to bias the pressure receiving plate, so that the pressure receiving plate can pivot about the first axis against the biasing force of the first biasing device when the load is applied;
a second biasing device constructed to bias the connecting arm toward the first position.

22. A headrest operating device for moving a headrest of a vehicle seat, comprising:
a headrest moving mechanism configured to be able to move the headrest;
an actuation device;
a first coupling member capable of being moved by the actuation device;
a second coupling member coupled to the headrest moving mechanism;
a control device configured to be able to shift a moving path of the first coupling member between a first path and a second path;
wherein the movement of the first coupling member is transmitted to the second coupling member when the first coupling member moves along the first path; and
wherein the movement of the first coupling member is not transmitted to the second coupling member when the first coupling member moves along the second path;
the first coupling member includes a pin;
the control device includes a control member and a switching member;
the control member has a slot formed therein;
the pin is inserted into the slot;
the switching member is operable to shift the moving path of the pin by moving the pin within the slot,
wherein the switching member is a weight mounted to the first coupling member.

* * * * *